US012425320B2

United States Patent
Xin et al.

(10) Patent No.: US 12,425,320 B2
(45) Date of Patent: *Sep. 23, 2025

(54) COMMUNICATION METHOD, AND COMMUNICATION APPARATUS AND SYSTEM

(71) Applicant: Huawei Technologies Co., Ltd., Shenzhen (CN)

(72) Inventors: Yang Xin, Shanghai (CN); Weiwei Chong, Shenzhen (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,613

(22) Filed: Jun. 13, 2024

(65) Prior Publication Data

US 2024/0333620 A1  Oct. 3, 2024

Related U.S. Application Data

(63) Continuation of application No. 18/167,669, filed on Feb. 10, 2023, now Pat. No. 12,034,621, which is a (Continued)

(30) Foreign Application Priority Data

Aug. 13, 2020 (CN) .......................... 202010814326.3

(51) Int. Cl.
*H04L 43/0852* (2022.01)
*H04L 41/14* (2022.01)

(52) U.S. Cl.
CPC .......... *H04L 43/0852* (2013.01); *H04L 41/14* (2013.01)

(58) Field of Classification Search
None
See application file for complete search history.

(56) References Cited

U.S. PATENT DOCUMENTS

| | | | |
|---|---|---|---|
| 2017/0078157 A1* | 3/2017 | Zhang | H04W 4/70 |
| 2018/0262924 A1* | 9/2018 | Dao | H04W 72/535 |

(Continued)

FOREIGN PATENT DOCUMENTS

| | | |
|---|---|---|
| CN | 110383877 A | 10/2019 |
| CN | 110784434 A | 2/2020 |

(Continued)

OTHER PUBLICATIONS

3GPP TS 23.288 V16.4.0 (Jul. 2020), "3rd Generation Partnership Project, Technical Specification Group Services and System Aspects, Architecture enhancements for 5G System (5GS) to support network data analytics services (Release 16)", Sophia Antipolis, Valbonne—France, 66 pages.

(Continued)

*Primary Examiner* — Lashonda Jacobs-Burton
(74) *Attorney, Agent, or Firm* — Slater Matsil, LLP

(57) ABSTRACT

A communication method, a communication apparatus, and system are disclosed. The method includes a data analytics network element (NWDAF) sends a first request to a storage function network element. The first request includes delay information and/or indication information. The indication information indicates that the NWDAF supports analyzing data within a specified delay. The first request is used to store the delay information and/or the indication information into the storage function network element. The data analytics network element receives a first response from the storage function network element. The first response indicates, to (Continued)

the data analytics network element, that the delay information and/or the indication information are/is successfully stored.

15 Claims, 21 Drawing Sheets

Related U.S. Application Data continuation of application No. PCT/CN2021/096271, filed on May 27, 2021.

(56) References Cited

U.S. PATENT DOCUMENTS

| | | | |
|---|---|---|---|
| 2019/0222489 A1 | 7/2019 | Shan | |
| 2020/0196169 A1 | 6/2020 | Dao et al. | |
| 2020/0204477 A1* | 6/2020 | Rahman | H04L 65/612 |
| 2020/0228420 A1 | 7/2020 | Dao et al. | |
| 2020/0252813 A1 | 8/2020 | Li et al. | |
| 2021/0092588 A1* | 3/2021 | Xin | H04W 60/00 |
| 2021/0144076 A1* | 5/2021 | Lee | G06F 18/214 |
| 2021/0282038 A1* | 9/2021 | Li | G06Q 20/382 |
| 2023/0117382 A1* | 4/2023 | Zhang | H04L 41/14 |
| | | | 709/224 |
| 2023/0188424 A1* | 6/2023 | Xin | G06F 18/20 |
| | | | 709/223 |

FOREIGN PATENT DOCUMENTS

| | | | | |
|---|---|---|---|---|
| CN | 110798360 A | 2/2020 | | |
| WO | WO-2019032968 A1 * | 2/2019 | | G06Q 20/382 |
| WO | 2020143373 A1 | 7/2020 | | |
| WO | WO-2021083612 A1 * | 5/2021 | | H04L 41/042 |
| WO | WO-2021197773 A1 * | 10/2021 | | |

OTHER PUBLICATIONS

3GPP TS 23.501 V16.5.1 (Aug. 2020), "3rd Generation Partnership Project, Technical Specification Group Services and System Aspects, System architecture for the 5G System (5GS), Stage 2 (Release 16)", Sophia Antipolis, Valbonne—France, 440 pages.
3GPP TS 23.502 V16.5.1 (Aug. 2020), "3rd Generation Partnership Project, Technical Specification Group Services and System Aspects, Procedures for the 5G System (5GS), Stage 2 (Release 16)", Sophia Antipolis, Valbonne—France, 594 pages.
3GPP TS 29.510 V16.4.0 (Jul. 2020), "3rd Generation Partnership Project, Technical Specification Group Core Network and Terminals, 5G System, Network Function Repository Services, Stage 3 (Release 16)", Sophia Antipolis, Valbonne—France, 192 pages.
3GPP TS 29.520 V16.4.0 (Jun. 2020), "3rd Generation Partnership Project, Technical Specification Group Core Network and Terminals, 5G System, Network Data Analytics Services, Stage 3 (Release 16)", Sophia Antipolis, Valbonne—France, 91 pages.
3GPP TS 36.331 V16.1.1 (Jul. 2020), "3rd Generation Partnership Project, Technical Specification Group Radio Access Network; Evolved Universal Terrestrial Radio Access (E-UTRA), Radio Resource Control (RRC), Protocol specification (Release 16)", Sophia Antipolis, Valbonne—France, 1078 pages.
3GPP TS 38.215 V16.2.0 (Jun. 2020), "3rd Generation Partnership Project, Technical Specification Group Radio Access Network, NR, Physical layer measurements (Release 16)", Sophia Antipolis, Valbonne—France, 25 pages.
3GPP TS 38.331 V16.1.0 (Jul. 2020), "3rd Generation Partnership Project, Technical Specification Group Radio Access Network, NR, Radio Resource Control (RRC) protocol specification (Release 16)", Sophia Antipolis, Valbonne—France, 906 pages.
Catt, "KI #1, New Sol: NWDAF decomposition", SA WG2 Meeting #S2-139E, S2-2004181, Elbonia, Jun. 1-12, 2020, 3 pages.
China Mobile, "KI #19, New Sol, Trained Data Model Sharing between NWDAF instances", 3GPP TSG-WG SA2 Meeting #139E, S2-2004043, Electronic meeting, Jun. 1-12, 2020, 4 pages.
China Unicom, "KI #18, New Sol: Pre-analytics based solution for Real-Time communication with NWDAF", 3GPP TSG-SA/WG2 Meeting #139E, S2-2003905, Elbonia, Jun. 1-12, 2020, 5 pages.
China Unicom, "KI #18, New Sol: Pre-analytics based solution for Real-Time communication with NWDAF", 3GPP TSG-SA/WG2 Meeting #139E, S2-2004567, Elbonia, Jun. 1-12, 2020, 6 pages.
China Unicom et al., "KI #18, Sol 54: Update to merge Solution#55 into Solution #54", SA WG2 Meeting #141E e-meeting, S2-2006954r03, Elbonia, Oct. 12-23, 2020, 9 pages.
Etri, "KI#11 and #18, New Sol: Enhancement on network exposure to allow data approximation", SA WG2 Meeting #139E, S2-2003941, Elbonia, Jun. 1-12, 2020, 4 pages.
Etri, "KI#11 and #18, New Sol: Enhancement on network exposure to allow data approximation", SA WG2 Meeting #139E, S2-2004087, Elbonia, Jun. 1-12, 2020, 4 pages.
Samsung, "New key issue: Enhancement for real-time communication with NWDAF", SA WG2 Meeting #136AH, S2-2000647, Incheon, Korea, Jan. 13-17, 2020, 2 pages.
Samsung, "New key issue: Enhancement for real-time communication with NWDAF", SA WG2 Meeting #136AH, S2-2001227, Incheon, Korea, Jan. 13-17, 2020, 3 pages.
Samsung, "New key issue: Enhancement for real-time communication with NWDAF", SA WG2 Meeting #136AH, S2-2001695, Incheon, Korea, Jan. 13-17, 2020, 3 pages.
Tencent, "KI#18, New Sol: Enhancement for Real-Time Communication with NWDAF", 3GPP SA WG2 Meeting #139E, S2-2004087, Elbonia, Jun. 1-12, 2020, 3 pages.
Tencent, "KI#18, New Sol: Enhancement for Real-Time Communication with NWDAF", 3GPP SA WG2 Meeting #139E, S2-2004568, Elbonia, Jun. 1-12, 2020, 3 pages.

* cited by examiner

COMMUNICATION METHOD, AND COMMUNICATION APPARATUS AND SYSTEM

CROSS-REFERENCE TO RELATED APPLICATIONS

This application is a continuation of U.S. patent application Ser. No. 18/167,669, filed on Feb. 10, 2023, now U.S. Pat. No. 12,034,621, which is a continuation of International Application No. PCT/CN2021/096271, filed on May 27, 2021, which claims priority to Chinese Patent Application No. 202010814326.3, filed on Aug. 13, 2020. The disclosures of the aforementioned applications are hereby incorporated by reference in their entireties.

TECHNICAL FIELD

This application relates to the communications field, and in particular, to a communication method, and a communication apparatus and system.

BACKGROUND

A data analytics network element is introduced into a fifth generation (5G) communication network. A current data analytics network element may generate a data analytics result. The data analytics result may be used for data analytics in a wireless communication system, to enable the wireless communication system to be intelligent.

If the data analytics network element does not generate the data analytics result in time, making a correct decision based on the data analytics result by a network device in the wireless communication system is affected. For example, the data analytics network element may analyze service experience of a service. The data analytics network element sends the data analytics result to a policy control function (PCF) network element. The PCF network element may adjust, based on the service experience, a quality of service (QOS) parameter corresponding to the service. However, if the data analytics network element provides the data analytics result for the PCF excessively late, the service experience of the service may have changed. In this case, the PCF adjusts the QoS parameter based on non-real-time service experience, and this clearly does not meet a requirement of the service.

SUMMARY

Embodiments of this application provide a communication method, and a communication apparatus and system, to enable a data analytics network element to determine a data analytics delay, and enable a network element that uses a data analytics result to predetermine, in advance, a delay requirement that can be met by the data analytics network element.

To resolve the foregoing technical problem, embodiments of this application provide the following technical solutions.

According to a first aspect, an embodiment of this application provides a communication method, including: A data analytics network element sends a first request to a storage function network element. The first request includes delay information and/or indication information. The delay information includes one or more of the following information: a collection delay of first data, an inference delay of a data analytics result of the first data, and a transfer delay of the data analytics result. The indication information indicates that the data analytics network element supports analyzing data within a specified delay. The first request is used to store the delay information and/or the indication information into the storage function network element. The data analytics network element receives a first response from the storage function network element. The first response indicates, to the data analytics network element, that the delay information and/or the indication information are/is successfully stored.

In the foregoing solution, the first request sent by the data analytics network element may include the delay information. The delay information may include one or more of the following information: the collection delay of the first data, the inference delay of the data analytics result of the first data, and the transfer delay of the data analytics result. Alternatively, the first request includes the indication information. The indication information indicates that the data analytics network element supports analyzing data within the specified delay. Therefore, the storage function network element may store the delay information and/or the indication information into the storage function network element based on the received first request, to enable the data analytics network element to determine a data analytics delay, and enable a network element that uses the data analytics result to predetermine, in advance, a delay requirement that can be met by the data analytics network element.

In a possible implementation, the method further includes: The data analytics network element sends a second request to a first network function network element. The second request is used to request the first data. The data analytics network element receives a second response sent by the first network function network element. The second response includes the first data and first transfer start time of the first data. The first transfer start time is start time at which the first network function network element transfers the first data. The data analytics network element determines the collection delay of the first data based on the first transfer start time of the first data and first transfer end time of the first data. The first transfer end time is time at which the data analytics network element completes receiving the first data from the first network function network element. In the foregoing solution, the data analytics network element may receive the second response of the first network function network element, obtain the first transfer start time of the first data from the second response, and determine the collection delay of the first data based on the first transfer start time of the first data and the first transfer end time of the first data, to resolve a problem that the data analytics network element cannot determine the collection delay of the first data.

In a possible implementation, the method further includes: The data analytics network element sends a third request to a first network function network element. The third request is used to request the first data. The data analytics network element receives a third response sent by the first network function network element. The third response includes the first data, second transfer start time of the first data, and a first preparation delay of the first data. The second transfer start time is start time at which the first network function network element transfers the first data. The first preparation delay is duration occupied by the first network function network element to prepare the first data. The data analytics network element determines a first transfer delay of the first data based on the second transfer start time of the first data and second transfer end time of the first data. The second transfer end time is time at which the data analytics network element completes receiving the first data from the first network function network element. The data analytics network element determines the collection delay of the first data based on the first transfer delay of the first data and the first preparation delay of the first data. In the foregoing solution, the data analytics network element may receive the third response of the first network function network element, obtain the second transfer start time of the first data and the first preparation delay of the first data from the third response, determine the first transfer delay of the first data based on the second transfer start time of the first data and the second transfer end time of the first data, and determine the collection delay of the first data based on the first transfer delay of the first data and the first preparation delay of the first data, to resolve the problem that the data analytics network element cannot determine the collection delay of the first data.

In a possible implementation, the first network function network element is a data repository device.

In a possible implementation, when the first data is stored in the first network function network element, the first preparation delay of the first data includes a query delay of the first data. The query delay of the first data is duration occupied by the first network function network element to obtain the first data through query based on the third request. In the foregoing solution.

In a possible implementation, when the first data is not stored in the first network function network element, the method further includes: The first network function network element sends a fourth request to a second network function network element. The fourth request is used to request the first data. The first network function network element receives a fourth response sent by the second network function network element. The fourth response includes the first data and third transfer start time of the first data. The third transfer start time is start time at which the second network function network element transfers the first data. The first preparation delay is obtained by the first network function network element based on the third transfer start time of the first data and third transfer end time of the first data. The third transfer end time is time at which the first network function network element completes receiving the first data from the second network function network element. In the foregoing solution, the first network function network element may request the first data from the second network function network element. After the first network function network element obtains the first data, the first network function network element sends the third response to the data analytics network element. The data analytics network element may receive the third response of the first network function network element, obtain the second transfer start time of the first data and the first preparation delay of the first data from the third response, determine the first transfer delay of the first data based on the second transfer start time of the first data and the second transfer end time of the first data, and determine the collection delay of the first data based on the first transfer delay of the first data and the first preparation delay of the first data, to resolve the problem that the data analytics network element cannot determine the collection delay of the first data. In this way, the network element that uses the data analytics result predetermines, in advance, the delay requirement that can be met by the data analytics network element.

In a possible implementation, when the first data is not stored in the first network function network element, the method further includes: The first network function network element sends a fifth request to a second network function network element. The fifth request is used to request the first data. The first network function network element receives a fifth response sent by the second network function network element. The fifth response includes the first data, fourth transfer start time, and a second preparation delay of the first data. The fourth transfer start time is start time at which the second network function network element transfers the first data. The second preparation delay is duration occupied by the second network function network element to determine the first data. The first preparation delay is obtained by the first network function network element based on the fourth transfer start time of the first data, fourth transfer end time of the first data, and the second preparation delay of the first data. The fourth transfer end time is time at which the first network function network element completes receiving the first data from the second network function network element.

In the foregoing solution, when the first network function network element does not store the first data, the first network function network element may request the first data from the second network function network element. A preparation delay of preparing the first data by the second network function network element is the second preparation delay. In this case, the first preparation delay obtained by the first network function network element includes the second preparation delay. Finally, the data analytics network element determines the collection delay of the first data based on the first transfer delay of the first data and the first preparation delay of the first data. This resolves the problem that the data analytics network element cannot determine the collection delay of the first data. In this way, the network element that uses the data analytics result predetermines, in advance, the delay requirement that can be met by the data analytics network element.

In a possible implementation, the method further includes: The data analytics network element determines the inference delay of the data analytics result based on the first data. In the foregoing solution, specific duration needs to be occupied by the data analytics network element to analyze the first data. For example, the data analytics network element analyzes the first data to generate the data analytics result, and duration needed by the data analytics network element to generate the data analytics result is the inference delay of the data analytics result.

In a possible implementation, the method further includes: The data analytics network element receives a sixth request sent by a third network function network element. The sixth request is used to request the data analytics result. The data analytics network element sends a sixth response to the third network function network element. The sixth response includes the data analytics result. The data analytics network element determines the transfer delay of the data analytics result based on the sixth response. In the foregoing solution, the data analytics network element receives the sixth request, and then sends the sixth response. By transferring the data analytics result, the data analytics network element may determine the transfer delay of the data analytics result, to resolve the problem that the data analytics network element cannot determine the transfer delay of the data analytics result.

In a possible implementation, that the data analytics network element determines the transfer delay of the data analytics result based on the sixth response includes: The data analytics network element receives transfer end time of the data analytics result that is sent by the third network function network element. The transfer end time of the data analytics result is time at which the third network function network element completes sending the data analytics result.

The data analytics network element determines the transfer delay of the data analytics result based on transfer start time of the data analytics result and the transfer end time of the data analytics result. The transfer start time of the data analytics result is start time at which the data analytics network element sends the data analytics result. In the foregoing solution, the data analytics network element obtains the transfer end time of the data analytics result from the third network function network element, and then the data analytics network element obtains the transfer delay of the data analytics result by itself. For example, the transfer delay of the data analytics result is equal to the transfer end time of the data analytics result minus the transfer start time of the data analytics network element based on the data analytics result. This resolves a problem that the data analytics network element cannot determine the transfer delay of the data analytics result.

In a possible implementation, that the data analytics network element determines the transfer delay of the data analytics result based on the sixth response includes: The data analytics network element sends transfer start time of the data analytics result to the third network function network element. The transfer start time of the data analytics result is start time at which the data analytics network element sends the data analytics result. The data analytics network element receives the transfer delay of the data analytics result that is sent by the third network function network element. The transfer delay of the data analytics result is determined by the third network function network element based on the transfer start time of the data analytics result and transfer end time of the data analytics result. The transfer end time of the data analytics result is time at which the third network function network element completes sending the data analytics result. In the foregoing solution, the data analytics network element may send the transfer start time of the data analytics result to the third network function network element, and then the third network function network element obtains the transfer delay of the data analytics result by itself. For example, the transfer delay of the data analytics result is equal to the transfer end time of the data analytics result minus the transfer start time of the data analytics network element based on the data analytics result. The data analytics network element receives the transfer delay of the data analytics result that is sent by the third network function network element, to resolve the problem that the data analytics network element cannot determine the transfer delay of the data analytics result.

In a possible implementation, the first request further includes an analytics identifier. The delay information is delay information corresponding to the analytics identifier. The indication information is indication information corresponding to the analytics identifier. In the foregoing solution, the data analytics network element may further include the analytics identifier in the first request, so that both the delay information and the indication information may correspond to the analytics identifier. Therefore, the delay information and the indication information of the data analytics network element may be determined by using the analytics identifier corresponding to the data analytics network element.

In a possible implementation, the delay information is determined based on an area in which the data analytics network element is located, a network topology to which the data analytics network element belongs, and a hardware capability supported by the data analytics network element. In the foregoing solution, the delay information of the data analytics network element relates to a parameter of the data analytics network element. For example, at least one parameter of the area in which the data analytics network element is located, the network topology to which the data analytics network element belongs, and the hardware capability supported by the data analytics network element may be used to determine the delay information. In this embodiment of this application, the delay information corresponding to the data analytics network element may be determined by using the parameter of the data analytics network element, so that the data analytics network element can determine a delay of an entire data analytics process.

According to a second aspect, an embodiment of this application further provides a communication method, including: A storage function network element receives a first request from a data analytics network element. The first request includes delay information and/or indication information. The delay information includes one or more of the following information: a collection delay of first data, an inference delay of a data analytics result of the first data, and a transfer delay of the data analytics result. The indication information indicates that the data analytics network element supports analyzing the first data within a specified delay. The first request is used to store the delay information and/or the indication information in the storage function network element. The storage function network element sends a first response to the data analytics network element. The first response indicates, to the data analytics network element, that the delay information and/or the indication information are/is successfully stored.

In the foregoing solution, because the storage function network element may receive the first request from the data analytics network element, the storage function network element may obtain the delay information of the storage function network element, so that the storage function network element may determine one or more of the following information: the collection delay of the first data, the inference delay of the data analytics result of the first data, and the transfer delay of the data analytics result. Alternatively, the storage function network element may obtain the indication information of the storage function network element, so that the storage function network element may determine that the data analytics network element supports analyzing the first data within the specified delay. Therefore, the storage function network element may obtain a data analytics delay of the data analytics network element, to enable a network element that uses the data analytics result to predetermine, in advance, a delay requirement that can be met by the data analytics network element.

In a possible implementation, the method further includes: The storage function network element receives a seventh request from a fourth network function network element. The seventh request is used to request the data analytics network element. The storage function network element sends a seventh response to the fourth network function network element. The seventh response includes one or more data analytics network elements. In the foregoing solution, the data analytics network element receives the seventh request, and then sends the seventh response. Because the fourth network function network element may determine delay information respectively corresponding to the one or more data analytics network elements, the fourth network function network element determines, from the one or more data analytics network elements, a target data analytics network element that meets a data analytics delay requirement of the fourth network function network element, so that the fourth network function network element can communicate with the target data analytics network element, to implement communication of the fourth network function network element when the data analytics delay requirement is met.

In a possible implementation, the seventh request includes the data analytics delay requirement of the fourth network function network element. The method further includes: The storage function network element determines, based on delay information corresponding to a data analytics network element, the one or more data analytics network elements that meet the data analytics delay requirement. That the storage function network element sends a seventh response to the fourth network function network element includes: The storage function network element sends the seventh response to the fourth network function network element. The seventh response includes the one or more data analytics network elements that meet the data analytics delay requirement. In the foregoing solution, the storage function network element obtains the data analytics delay requirement of the fourth network function network element, and the storage function network element pre-stores the delay information corresponding to each data analytics network element. Therefore, the storage function network element may filter, based on the data analytics delay requirement, the delay information corresponding to each data analytics network element, to determine the one or more data analytics network elements that meet the data analytics delay requirement. The storage function network element sends the seventh response to the fourth network function network element. The seventh response carries the one or more data analytics network elements that meet the data analytics delay requirement, so that the fourth network function network element determines the one or more data analytics network elements that meet the data analytics delay requirement.

In a possible implementation, that the storage function network element sends a seventh response to the fourth network function network element includes: The storage function network element determines the one or more data analytics network elements that support analyzing data within a specified delay. The storage function network element sends the seventh response to the fourth network function network element. The seventh response includes the one or more data analytics network elements that support analyzing data within the specified delay. In the foregoing solution, the storage function network element obtains the one or more data analytics network elements that support analyzing data within the specified delay, and the storage function network element sends the seventh response to the fourth network function network element. The seventh response includes the one or more data analytics network elements that support analyzing data within the specified delay, so that the fourth network function network element determines the one or more data analytics network elements that support analyzing data within the specified delay, and then the fourth network function network element determines the target data analytics network element.

According to a third aspect, an embodiment of this application further provides a communication method, including: A fourth network function network element sends a seventh request to a storage function network element. The seventh request is used to request a data analytics network element. The fourth network function network element receives a seventh response sent by the storage function network element. The seventh response includes one or more data analytics network elements. The one or more data analytics network elements respectively correspond to delay information. The fourth network function network element determines, from the one or more data analytics network elements, a target data analytics network element that meets a data analytics delay requirement of the fourth network function network element.

In the foregoing solution, because the fourth network function network element may determine the delay information respectively corresponding to the one or more data analytics network elements, the fourth network function network element determines, from the one or more data analytics network elements, the target data analytics network element that meets the data analytics delay requirement of the fourth network function network element, so that the fourth network function network element can communicate with the target data analytics network element, to implement communication of the fourth network function network element when the data analytics delay requirement is met.

In a possible implementation, that the fourth network function network element determines, from the one or more data analytics network elements, a target data analytics network element that meets a data analytics delay requirement of the fourth network function network element includes: The fourth network function network element determines, from the seventh response, the delay information respectively corresponding to the one or more data analytics network elements. The fourth network function network element determines the target data analytics network element based on the delay information respectively corresponding to the one or more data analytics network elements and the data analytics delay requirement. In the foregoing solution, the fourth network function network element may obtain the delay information corresponding to each data analytics network element, and may filter, based on the data analytics delay requirement, the delay information corresponding to each data analytics network element, to determine the target data analytics network element that meets the data analytics delay requirement.

In a possible implementation, that the fourth network function network element determines the target data analytics network element based on the seventh response includes: The fourth network function network element sends the data analytics delay requirement to the one or more data analytics network elements separately. The fourth network function network element receives a delay matching result sent by at least one data analytics network element that meets the data analytics delay requirement. The fourth network function network element determines the target data analytics network element from the at least one data analytics network element that sends the delay matching result. In the foregoing solution, the fourth network function network element may send the data analytics delay requirement to each data analytics network element. Each data analytics network element matches with delay information of the data analytics network element based on the data analytics delay requirement. The at least one data analytics network element that meets the data analytics delay requirement sends the delay matching result to the fourth network function network element. The fourth network function network element determines the at least one data analytics network element that sends the delay matching result, and then the fourth network function network element determines the target data analytics network element.

According to a fourth aspect, an embodiment of this application further provides a communication apparatus, including: a sending module, configured to send a first request to a storage function network element, where the first request includes delay information and/or indication information, the delay information includes one or more of the following information: a collection delay of first data, an inference delay of a data analytics result of the first data, and a transfer delay of the data analytics result, the indication information indicates that the data analytics network element supports analyzing data within a specified delay, and the first request is used to store the delay information and/or the indication information into the storage function network element; and a receiving module, configured to receive a first response from the storage function network element, where the first response indicates, to the data analytics network element, that the delay information and/or the indication information are/is successfully stored.

In the fourth aspect of this application, the modules in the communication apparatus may further perform the steps described in the first aspect and the possible implementations of the first aspect. For details, refer to the descriptions in the first aspect and the possible implementations of the first aspect.

According to a fifth aspect, an embodiment of this application further provides a communication apparatus, including: a receiving module, configured to receive a first request from a data analytics network element, where the first request includes delay information and/or indication information, the delay information includes one or more of the following information: a collection delay of first data, an inference delay of a data analytics result of the first data, and a transfer delay of the data analytics result, the indication information indicates that the data analytics network element supports analyzing the first data within a specified delay, and the first request is used to store the delay information and/or the indication information into the storage function network element; and a sending module, configured to send a first response to the data analytics network element, where the first response indicates, to the data analytics network element, that the delay information and/or the indication information are/is successfully stored.

In the fifth aspect of this application, the modules in the communication apparatus may further perform the steps described in the second aspect and the possible implementations of the second aspect. For details, refer to the descriptions in the second aspect and the possible implementations of the second aspect.

According to a sixth aspect, an embodiment of this application further provides a communication apparatus, including: a sending module, configured to send a seventh request to a storage function network element, where the seventh request is used to request a data analytics network element; a receiving module, configured to receive a seventh response sent by the storage function network element, where the seventh response includes one or more data analytics network elements, and the one or more data analytics network elements respectively correspond to delay information; and a processing module, configured to determine, from the one or more data analytics network elements, a target data analytics network element that meets a data analytics delay requirement of the fourth network function network element.

In the sixth aspect of this application, the modules in the communication apparatus may further perform the steps described in the third aspect and the possible implementations of the third aspect. For details, refer to the descriptions in the third aspect and the possible implementations of the third aspect.

In the first aspect to the sixth aspect of this application, the data analytics network element may be an NWDAF network element, the storage function network element may be an NRF network element, and the first network function network element may be a data repository device. For example, the first network function network element is a DCCF, the second network function network element is an NF network element having a data provider function, the third network function network element is a consumer NF network element, and the fourth network function network element may be another consumer NF network element.

In this embodiment of this application, the collection delay of the first data is duration occupied by the data analytics network element to collect the first data, the inference delay of the data analytics result is duration occupied by the data analytics network element to perform inference on the first data to obtain the data analytics result, and the transfer delay of the data analytics result is duration occupied by the data analytics network element to transfer the data analytics result.

According to a seventh aspect, an embodiment of this application provides a computer-readable storage medium. The computer-readable storage medium stores instructions. When the instructions are run on a computer, the computer is enabled to perform the method according to the first aspect, the second aspect, or the third aspect.

According to an eighth aspect, an embodiment of this application provides a computer program product including instructions. When the computer program product runs on a computer, the computer is enabled to perform the method according to the first aspect, the second aspect, or the third aspect.

According to a ninth aspect, an embodiment of this application provides a communication apparatus. The communication apparatus may include an entity such as a data analytics network element, a storage function network element, a fourth network function network element, or a chip. The communication apparatus includes a processor and a memory. The memory is configured to store instructions. The processor is configured to execute the instructions in the memory, so that the communication apparatus performs the method according to any one of the first aspect, the second aspect, or the third aspect.

According to a tenth aspect, this application provides a chip system. The chip system includes a processor, configured to support a data analytics network element, a storage function network element, or a fourth network function network element in implementing a function in the foregoing aspects, for example, sending or processing data and/or information in the foregoing methods. In a possible design, the chip system further includes a memory. The memory is configured to store program instructions and data that are necessary for the data analytics network element, the storage function network element, or the fourth network function network element. The chip system may include a chip, or may include a chip and another discrete component.

According to an eleventh aspect, an embodiment of this application provides a communication system, including a data analytics network element, configured to perform the method according to any one of the first aspect and the possible implementations of the first aspect, and a storage function network element, configured to perform the method according to any one of the second aspect and the possible implementations of the second aspect. An embodiment of this application further provides another communication system, including a storage function network element, configured to perform the method according to any one of the second aspect and the possible implementations of the second aspect, and a fourth network function network element, configured to perform the method according to any one of the third aspect and the possible implementations of the third aspect.

DETAILED DESCRIPTION OF ILLUSTRATIVE EMBODIMENTS

The following describes embodiments of this application with reference to accompanying drawings.

In the specification, claims, and accompanying drawings of embodiments of this application, terms such as "first" and "second" are intended to distinguish between similar objects but do not necessarily indicate a specific order or sequence. It should be understood that the terms used in such a way are interchangeable in proper cases. This is merely a distinguishing manner that is used when objects having a same attribute are described in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

The term "and/or" in embodiments of this application describes only an association relationship for describing associated objects and indicates that three relationships may exist. For example, A and/or B may represent the following three cases: Only A exists, both A and B exist, and only B exists. In addition, in the descriptions of this application, "a plurality of" means two or more than two. In addition, in the embodiments of this application, "/" may indicate an and/or relationship.

Figure 1A:
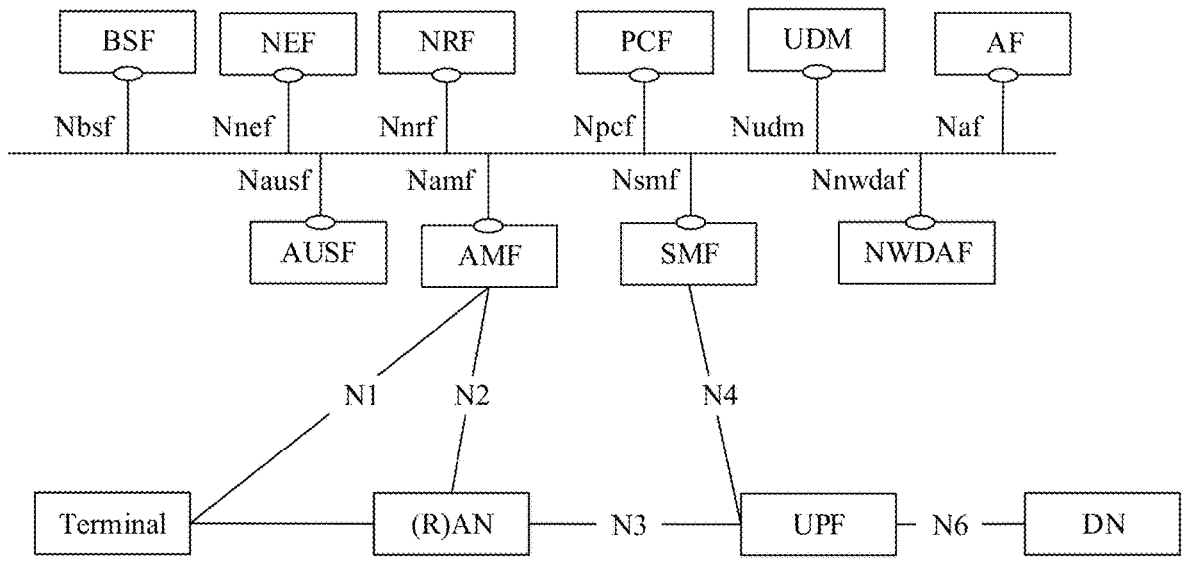
FIG. 1a to FIG. 1f each are a schematic diagram of an architecture of a communication system according to an embodiment of this application.

An example system in FIG. 1a is a 5G system with a service-based interface. The 5G system may include an authentication server function (AUSF) network element, an access and mobility management function (AMF) network element, a data network (DN), a unified data management (UDM) network element, a policy control function (PCF) network element, a (radio) access network ((R)AN) network element, a user plane function (UPF) network element, a terminal device, an application function (AF) network element, a session management function (SMF) network element, a binding support function (BSF) network element, a network data analytics function (NWDAF) network element, a network exposure function (NEF) network element, and a network repository function (NRF) network element.

For ease of description, the (R)AN network element, the AMF network element, the SMF network element, the UDM network element, the UPF network element, the PCF network element, the BSF network element, the NWDAF network element, the NRF network element, the NEF network element, and the like are respectively referred to as a RAN, an AMF, an SMF, a UDM, a UPF, a PCF, a BSF, an NWDAF, an NRF, an NEF, and the like in the following.

The 5G system is divided into two parts: an access network and a core network. The access network is used to implement a function related to wireless access, and mainly includes a RAN. The core network is used for network service control, data transfer, and the like. The core network includes a plurality of network elements. For example, the core network may mainly include an AMF, an SMF, a UPF, a PCF, a UDM, and the like.

Functions of some network elements in FIG. 1a are as follows.

The PCF is responsible for providing a policy, such as a quality of service (QOS) policy or a slice selection policy, for the AMF or the SMF.

The UDM is used to process 3rd generation partnership project (3GPP) authentication and key agreement (AKA) authentication credentials, user identification processing, access authorization, registration/mobility management, subscription management, short message service management, and the like. In this application, the UDM may provide a function of storing information about a network element (a serving NF, for example, a serving AMF, a serving SMF, or a serving NWDAF) that currently serves the terminal device.

The AF may be an application server, and may belong to an operator or a third party. The AF mainly supports interacting with a 3GPP core network to provide a service, for example, a service that affects a data routing decision or a policy control function, or some third-party services provided for a network side.

The AMF is mainly responsible for a signaling processing part, for example, functions such as registration management of the terminal device, connection management of the terminal device, reachability management of the terminal device, access authorization and access authentication of the terminal device, a security function of the terminal device, mobility management (for example, location update of the terminal device, registration of the terminal device with a network, and terminal device handover) of the terminal device, network slice selection, SMF selection, and registration or deregistration of the terminal device.

The SMF is mainly responsible for all control plane functions of session management of the terminal device, including UPF selection, control, and redirection, internet protocol (IP) address allocation and management, session QoS management, policy and charging control (PCC) policy obtaining from the PCF, bearer or session establishment, modification, and release, and the like.

The UPF serves as an anchor of a protocol data unit (protocol data unit, PDU) session connection, and is responsible for data packet filtering, data transfer/forwarding, rate control, charging information generation, user plane QoS processing, uplink transfer authentication, transfer level verification, downlink data packet buffering, downlink data notification triggering, and the like of the terminal device. The UPF may also serve as a branching point of a multi-homed PDU session. A resource transfer and scheduling function that is used by the UPF to provide a service for the terminal device is managed and controlled by the SMF.

The NRF is a network element that stores information such as a network element attribute, a network element status, and a network topology relationship, and has a network element discovery function and a network element management function.

The BSF has a function of binding or storing a corresponding terminal device address, terminal device identifier, data network name (DNN), single network slice selection assistance information (S-NSSAI), PCF instance, and PCF set identifier for a PDU session. For example, a PCF corresponding to the terminal device may be found from the BSF.

The NWDAF has at least one of the following functions: a data collection function and a data analytics function. The data collection function is to collect related data from a network element, a third-party service server, a terminal device, or a network management system. The data analytics function is to perform analytics training based on related input data, to provide a data analytics result for the network element, the third-party service server, the terminal device, or the network management system. The analytics result may assist a network in selecting a service quality parameter of a service, assist the network in performing routing traffic, assist the network in selecting a background traffic transfer policy, or the like. This application mainly involves the data collection function of the NWDAF. Because the NWDAF can execute associated training and analytics functions based on the collected data, a prerequisite is that the associated data can be collected and obtained.

In embodiments of this application, the NWDAF may be an independent network element, or may be co-deployed with another network element. For example, the NWDAF network element may be co-deployed with the AMF network element or co-deployed with the SMF network element.

The RAN is a network including one or more access network devices (which may also be referred to as a RAN node or a network device), and implements functions such as a radio physical layer function, resource scheduling and radio resource management, a radio access control and mobility management function, quality of service management, and data compression and encryption. The access network device is connected to the UPF through a user plane interface N3, and is configured to transfer data of the terminal device. The access network device establishes a control plane signaling connection to the AMF through a control plane interface N2, to implement functions such as radio access bearer control.

The access network device may be a base station, a wireless fidelity (Wi-Fi) access point (AP), a worldwide interoperability for microwave access (WiMAX) site, or the like. There may be various forms of base stations, for example, a macro base station, a micro base station (also referred to as a small cell), a relay station, and an access point. The base station may be specifically an AP in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in a future 5G system, a base station in a future evolved public land mobile network (PLMN), or the like.

The terminal device may be a wireless terminal device or a wired terminal device. The wireless terminal device may refer to a device that provides a user with voice and/or data connectivity, a handheld device with a wireless connection function, or another processing device connected to a wireless modem. The terminal device and an access network device communicate with each other using an air interface technology (for example, an NR technology or an LTE technology). The terminal device and the terminal device may also communicate with each other using an air interface technology (for example, an NR technology or an LTE technology). The wireless terminal device may communicate with one or more core network devices using an access network device, for example, communicate with the AMF, the SMF, or the like. The wireless terminal device may be a mobile terminal device, for example, a mobile phone (or referred to as a "cellular" phone), a smartphone, a satellite wireless device, a wireless modem card, or a computer with a mobile terminal device. For example, the computer with the mobile terminal device may be a laptop, portable, pocket-sized, handheld, computer built-in, or in-vehicle mobile apparatus that exchanges voice and/or data with the access network device. For example, the wireless terminal device may be a device such as a personal communications service (PCS) phone, a cordless telephone set, a session initiation protocol (SIP) phone, a wireless local loop (WLL) station, a personal digital assistant (PDA), virtual reality (VR) glasses, augmented reality (AR) glasses, a machine type communication terminal device, or an Internet of Things terminal device. In Internet of Vehicles communication, a communication device mounted on a vehicle is a terminal device, and a road side unit (RSU) may also be used as a terminal device. A communication device mounted on an unmanned aerial vehicle may also be considered as a terminal device. The wireless terminal device may also be referred to as user equipment (UE), a terminal, a subscriber unit, a subscriber station, a mobile station, a mobile console, a remote station, an access point, an access terminal, a user terminal, a user agent, or the like.

The DN is an operator network that provides a data transfer service for the user, such as an internet protocol multimedia service (IMS) or Internet. The terminal device accesses the DN by establishing a PDU session from the terminal device to the access network device, the UPF, and the DN.

Figure 1B:
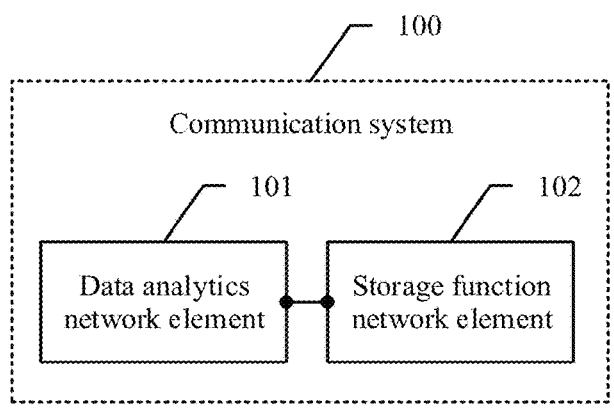

A communication method provided in embodiments of this application is applied to a communication system. As shown in FIG. 1b, a communication system 100 may include a data analytics network element 101 and a storage function network element 102.

The data analytics network element is configured to send a first request to the storage function network element. The first request includes delay information and/or indication information. The delay information includes one or more of the following information: a collection delay of first data, an inference delay of a data analytics result of the first data, and a transfer delay of the data analytics result. The indication information indicates that the data analytics network element supports analyzing data within a specified delay. The first request is used to store the delay information and/or the indication information into the storage function network element.

The storage function network element is configured to receive the first request from the data analytics network element. The first request includes the delay information and/or the indication information. The delay information includes one or more of the following information: the collection delay of the first data, the inference delay of the data analytics result of the first data, and the transfer delay of the data analytics result. The collection delay of the first data is duration occupied by the data analytics network element to collect the first data. The inference delay of the data analytics result is duration occupied by the data analytics network element to perform inference on the first data to obtain the data analytics result. The transfer delay of the data analytics result is duration occupied by the data analytics network element to transfer the data analytics result. The indication information indicates that the data analytics network element supports analyzing the first data within a specified delay. The first request is used to store the delay information and/or the indication information into the storage function network element.

The storage function network element is configured to send a first response to the data analytics network element. The first response indicates, to the data analytics network element, that the delay information and/or the indication information are/is successfully stored.

The data analytics network element is configured to receive the first response from the storage function network element. The first response indicates, to the data analytics network element, that the delay information and/or the indication information are/is successfully stored.

In some embodiments of this application, the collection delay of the first data is duration occupied by the data analytics network element to collect the first data, the inference delay of the data analytics result is duration occupied by the data analytics network element to perform inference on the first data to obtain the data analytics result, and the transfer delay of the data analytics result is duration occupied by the data analytics network element to transfer the data analytics result.

The data analytics network element is a network element that has a data analytics capability and can provide a data analytics result. For example, the data analytics network element may include an NWDAF network element. The NWDAF network element may perform data analytics on the first data, to generate the data analytics result. The data analytics may be implemented in a plurality of manners, for example, may be analytics for a traffic size, or analytics for a data type.

The storage function network element is a network element having a data storage function. For example, the storage function network element may be an NRF network element. For example, the NWDAF network element determines that a real-time data analytics capability is supported for an analytics identifier (Analytics ID), and then registers real-time interaction capability information and a corresponding analytics ID with the NRF network element. For example, the storage function network element receives the delay information and/or the indication information of the data analytics network element, and may store the delay information and/or the indication information.

It should be noted that, in embodiments of this application, the NWDAF network element may be abbreviated as an NWDAF, the NRF network element may be abbreviated as an NRF, and the like, which are not described one by one.

In the communication system provided in embodiments of this application, because the storage function network element may receive the first request from the data analytics network element, the storage function network element may obtain the delay information of the storage function network element, so that the storage function network element may determine one or more of the following information: the collection delay of the first data, the inference delay of the data analytics result of the first data, and the transfer delay of the data analytics result. Alternatively, the storage function network element may obtain the indication information of the storage function network element, so that the storage function network element may determine that the data analytics network element supports analyzing the first data within the specified delay. Therefore, the storage function network element may obtain a data analytics delay of the data analytics network element. In this way, a network element that uses the data analytics result predetermines, in advance, a delay requirement that can be met by the data analytics network element.

Figure 1C:
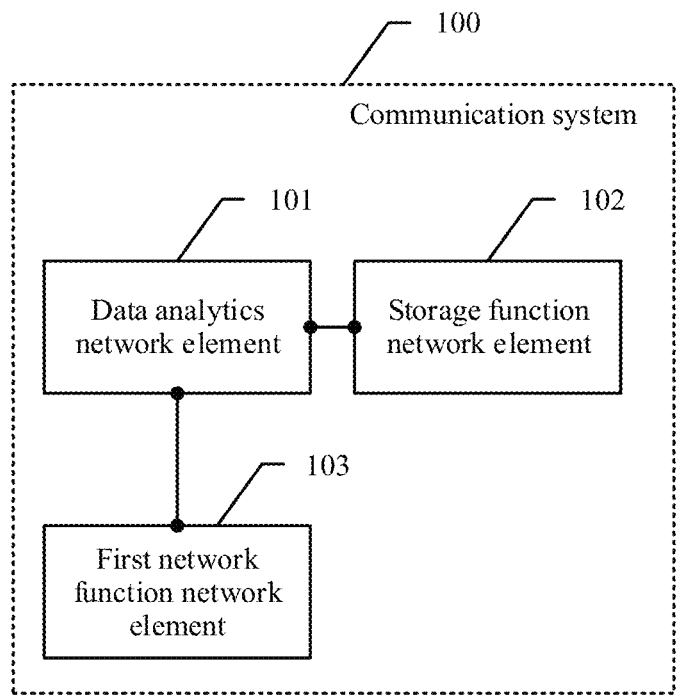

As shown in FIG. 1c, a communication system 100 may include a data analytics network element 101, a storage function network element 102, and a first network function network element 103.

The data analytics network element is configured to send a second request to the first network function network element. The second request is used to request first data.

The first network function network element is configured to receive the second request from the data analytics network element.

The first network function network element is configured to send a second response to the data analytics network element.

The data analytics network element is configured to receive the second response sent by the first network function network element. The second response includes the first data and first transfer start time of the first data. The first transfer start time is start time at which the first network function network element transfers the first data.

The data analytics network element is configured to determine a collection delay of the first data based on the first transfer start time of the first data and first transfer end time of the first data. The first transfer end time is time at which the data analytics network element completes receiving the first data from the first network function network element.

The first network function network element is a network element having a data provider function. For example, the first network function network element may be an NF network element having a data provider function.

In the communication system provided in embodiments of this application, the data analytics network element may receive the second response of the first network function network element, obtain the first transfer start time of the first data from the second response, and determine the collection delay of the first data based on the first transfer start time of the first data and the first transfer end time of the first data, to resolve a problem that the data analytics network element cannot determine the collection delay of the first data.

As shown in FIG. 1c, a communication system 100 may include a data analytics network element 101, a storage function network element 102, and a first network function network element 103.

The data analytics network element is configured to send a third request to the first network function network element. The third request is used to request first data.

The first network function network element is configured to receive the third request from the data analytics network element.

The first network function network element is configured to send a third response to the data analytics network element.

The data analytics network element is configured to receive the third response sent by the first network function network element. The third response includes the first data, second transfer start time of the first data, and a first preparation delay of the first data. The second transfer start time is start time at which the first network function network element transfers the first data. The first preparation delay is duration occupied by the first network function network element to prepare the first data.

The data analytics network element is configured to determine a first transfer delay of the first data based on the second transfer start time of the first data and second transfer end time of the first data. The second transfer end time is time at which the data analytics network element completes receiving the first data from the first network function network element.

The data analytics network element is configured to determine a collection delay of the first data based on the first transfer delay of the first data and the first preparation delay of the first data.

The first network function network element needs to occupy specific duration to prepare the first data. For example, the first preparation delay is the duration occupied by the first network function network element to prepare the first data. The third response includes the first preparation delay. The data analytics network element determines the collection delay of the first data based on the first transfer delay of the first data and the first preparation delay of the first data, so that the data analytics network element can accurately obtain the collection delay of the first data. In this way, a network element that uses the data analytics result predetermines, in advance, a delay requirement that can be met by the data analytics network element.

In some embodiments of this application, the first network function network element may be a data repository device. The data repository device is a device having a data repository function. The data repository device has a data storage function. For example, the data repository device may include one or more network elements. For example, the data repository device may be a data collection coordination function (DCCF) network element.

In the communication system provided in embodiments of this application, the data analytics network element may receive the third response of the first network function network element, obtain the second transfer start time of the first data and the first preparation delay of the first data from the third response, determine the first transfer delay of the first data based on the second transfer start time of the first data and the second transfer end time of the first data, and determine the collection delay of the first data based on the first transfer delay of the first data and the first preparation delay of the first data, to resolve a problem that the data analytics network element cannot determine the collection delay of the first data.

Figure 1D:
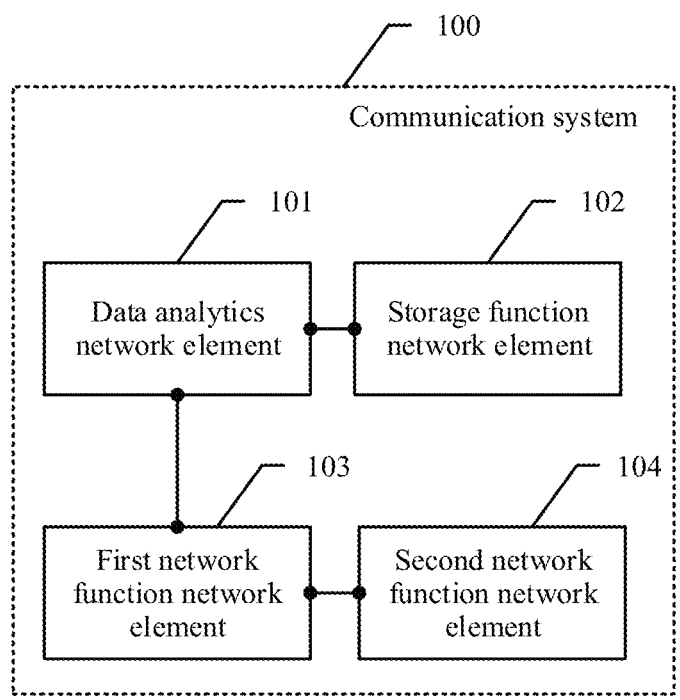

As shown in FIG. 1d, a communication system 100 may include a data analytics network element 101, a storage function network element 102, a first network function network element 103, and a second network function network element 104.

The data analytics network element is configured to send a third request to the first network function network element. The third request is used to request first data.

The first network function network element is configured to receive the third request from the data analytics network element.

When the first data is not stored in a data repository device, the first network function network element is configured to send a fourth request to the second network function network element. The fourth request is used to request the first data.

The second network function network element is configured to receive the fourth request from the first network function network element.

The second network function network element is configured to send a fourth response to the first network function network element. The fourth response includes the first data and third transfer start time.

The first network function network element is configured to receive the fourth response.

The first network function network element is configured to send a third response to the data analytics network element.

The data analytics network element is configured to receive the third response sent by the first network function network element. The third response includes the first data, second transfer start time of the first data, and a first preparation delay of the first data. The second transfer start time is start time at which the first network function network element transfers the first data. The first preparation delay is duration occupied by the first network function network element to prepare the first data.

The data analytics network element is configured to determine a first transfer delay of the first data based on the second transfer start time of the first data and second transfer end time of the first data. The second transfer end time is time at which the data analytics network element completes receiving the first data from the first network function network element.

The data analytics network element is configured to determine a collection delay of the first data based on the first transfer delay of the first data and the first preparation delay of the first data.

The first network function network element may be the data repository device. When the first data is not stored in the data repository device, the first network function network element may request the first data from the second network function network element. The second network function network element is a network element having a data provider function. For example, the second network function network element may be an NF having a data provider function. The first preparation delay is the duration occupied by the first network function network element to prepare the first data. The third response includes the first preparation delay. The data analytics network element determines the collection delay of the first data based on the first transfer delay of the first data and the first preparation delay of the first data, so that the data analytics network element can accurately obtain the collection delay of the first data. In this way, a network element that uses the data analytics result predetermines, in advance, a delay requirement that can be met by the data analytics network element.

In the communication system provided in embodiments of this application, the first network function network element may request the first data from the second network function network element. After the first network function network element obtains the first data, the first network function network element sends the third response to the data analytics network element. The data analytics network element may receive the third response of the first network function network element, obtain the second transfer start time of the first data and the first preparation delay of the first data from the third response, determine the first transfer delay of the first data based on the second transfer start time of the first data and the second transfer end time of the first data, and determine the collection delay of the first data based on the first transfer delay of the first data and the first preparation delay of the first data, to resolve a problem that the data analytics network element cannot determine the collection delay of the first data. In this way, the network element that uses the data analytics result predetermines, in advance, the delay requirement that can be met by the data analytics network element.

As shown in FIG. 1d, a communication system 100 may include a data analytics network element 101, a storage function network element 102, a first network function network element 103, and a second network function network element 104.

The data analytics network element is configured to send a third request to the first network function network element. The third request is used to request first data.

The first network function network element is configured to receive the third request from the data analytics network element.

When the first data is not stored in the first network function network element, the first network function network element is configured to send a fifth request to the second network function network element. The fifth request is used to request the first data.

The second network function network element is configured to receive the fifth request from the first network function network element.

The second network function network element is configured to send a fifth response to the first network function network element. The fifth response includes the first data, fourth transfer start time, and a second preparation delay of the first data.

The first network function network element is configured to receive the fifth response.

The first network function network element is a first network function network element.

When the first data is not stored in the first network function network element, the first preparation delay is obtained by the first network function network element based on the fourth transfer start time of the first data, fourth transfer end time of the first data, and the second preparation delay of the first data.

For example, the first preparation delay is equal to the fourth transfer end time of the first data minus the fourth transfer start time of the first data plus the second preparation delay of the first data.

The first network function network element is configured to send the fifth request to the second network function network element. The fifth request is used to request the first data.

The second network function network element is configured to send the fifth response to the first network function network element. The fifth response includes the first data, the fourth transfer start time, and the second preparation delay of the first data.

The fourth transfer start time is start time at which the second network function network element transfers the first data.

The fourth transfer end time is time at which the first network function network element completes receiving the first data from the second network function network element.

The second preparation delay is duration occupied by the second network function network element to determine the first data.

The first network function network element is configured to send a third response to the data analytics network element.

The data analytics network element is configured to receive the third response sent by the first network function network element. The third response includes the first data, second transfer start time of the first data, and the first preparation delay of the first data. The second transfer start time is start time at which the first network function network element transfers the first data. The first preparation delay is obtained by the first network function network element based on the fourth transfer start time of the first data, the fourth transfer end time of the first data, and the second preparation delay of the first data.

The data analytics network element is configured to determine a first transfer delay of the first data based on the second transfer start time of the first data and second transfer end time of the first data. The second transfer end time is time at which the data analytics network element completes receiving the first data from the first network function network element.

For example, the first transfer delay of the first data is equal to the second transfer end time of the first data minus the second transfer start time of the first data.

The data analytics network element is configured to determine a collection delay of the first data based on the first transfer delay of the first data and the first preparation delay of the first data.

For example, the collection delay of the first data is equal to the first preparation delay of the first data plus the first transfer delay of the first data.

In the foregoing communication system provided in embodiments of this application, when the first network function network element does not store the first data, the first network function network element may request the first data from the second network function network element. A preparation delay of preparing the first data by the second network function network element is the second preparation delay. In this case, the first preparation delay obtained by the first network function network element includes the second preparation delay. Finally, the data analytics network element determines the collection delay of the first data based on the first transfer delay of the first data and the first preparation delay of the first data. This resolves a problem that the data analytics network element cannot determine the collection delay of the first data. In this way, a network element that uses the data analytics result predetermines, in advance, a delay requirement that can be met by the data analytics network element.

Figure 1E:
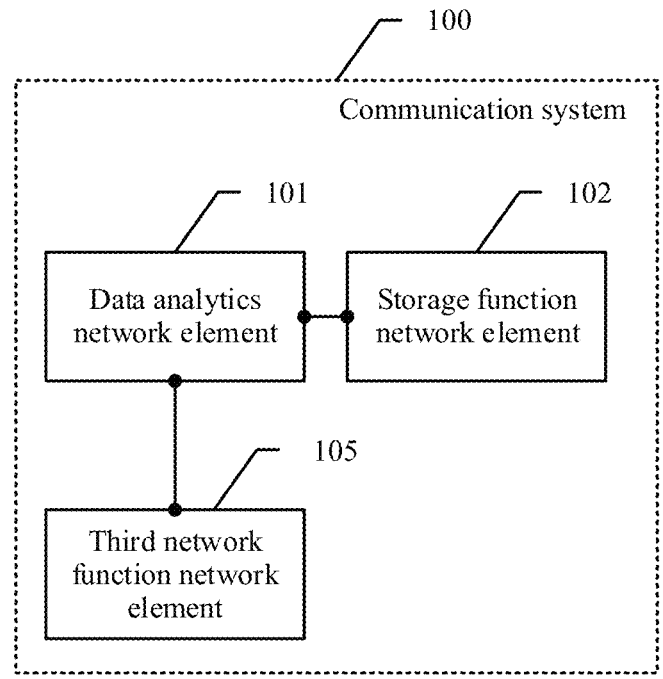
Figure 1F:
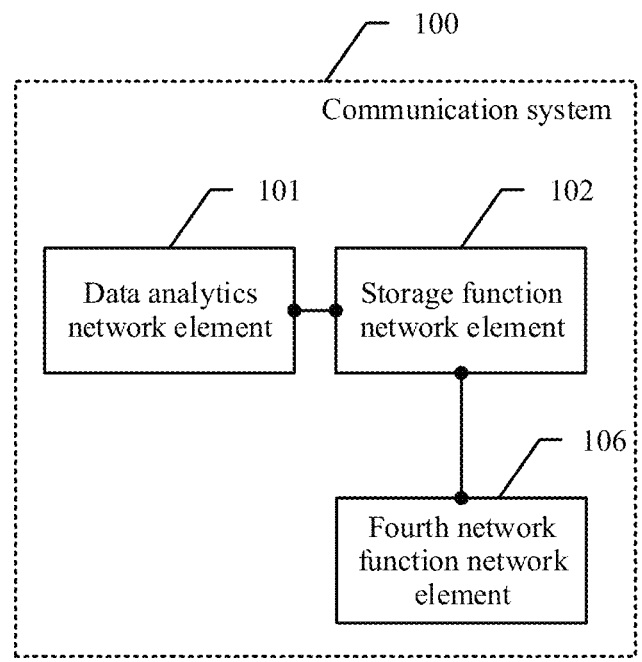

As shown in FIG. 1e, a communication system 100 may include a data analytics network element 101, a storage function network element 102, and a third network function network element 105.

The third network function network element is configured to send a sixth request to the data analytics network element.

The data analytics network element is configured to receive the sixth request sent by the third network function network element. The sixth request is used to request the data analytics result.

The data analytics network element is configured to send a sixth response to the third network function network element. The sixth response includes the data analytics result.

The data analytics network element is configured to determine a transfer delay of the data analytics result based on the sixth response.

The third network function network element requests to obtain the data analytics result from the data analytics network element. For example, the third network function network element may be a consumer network function (Consumer NF) network element. For example, when the third network function network element needs to obtain the data analytics result, the third network function network element sends the sixth request to the data analytics network element.

In the communication system provided in embodiments of this application, the data analytics network element receives the sixth request, and then sends the sixth response. By transferring the data analytics result, the data analytics network element may determine the transfer delay of the data analytics result, to resolve a problem that the data analytics network element cannot determine the transfer delay of the data analytics result.

As shown in FIG. if, a communication system 100 may include a data analytics network element 101, a storage function network element 102, and a fourth network function network element 106.

The fourth network function network element is configured to send a seventh request to the storage function network element. The seventh request is used to request the data analytics network element.

The storage function network element is configured to receive the seventh request from the fourth network function network element. The seventh request is used to request the data analytics network element.

The storage function network element is configured to send a seventh response to the fourth network function network element. The seventh response includes one or more data analytics network elements.

The fourth network function network element is configured to receive the seventh response sent by the storage function network element. The seventh response includes the one or more data analytics network elements. The one or more data analytics network elements respectively correspond to delay information.

The fourth network function network element is configured to determine, from the one or more data analytics network elements, a target data analytics network element that meets a data analytics delay requirement of the fourth network function network element.

The fourth network function network element is a network element requesting the data analytics result. For example, the fourth network function network element is a consumer NF network element. For example, when the fourth network function network element needs to obtain the data analytics result, the fourth network function network element sends the seventh request to the data analytics network element.

In the communication system provided in embodiments of this application, the data analytics network element receives the seventh request, and then sends the seventh response. Because the fourth network function network element may determine the delay information respectively corresponding to the one or more data analytics network elements, the fourth network function network element determines, from the one or more data analytics network elements, the target data analytics network element that meets the data analytics delay requirement of the fourth network function network element, so that the fourth network function network element can communicate with the target data analytics network element, to implement communication of the fourth network function network element when the data analytics delay requirement is met.

Figure 2:
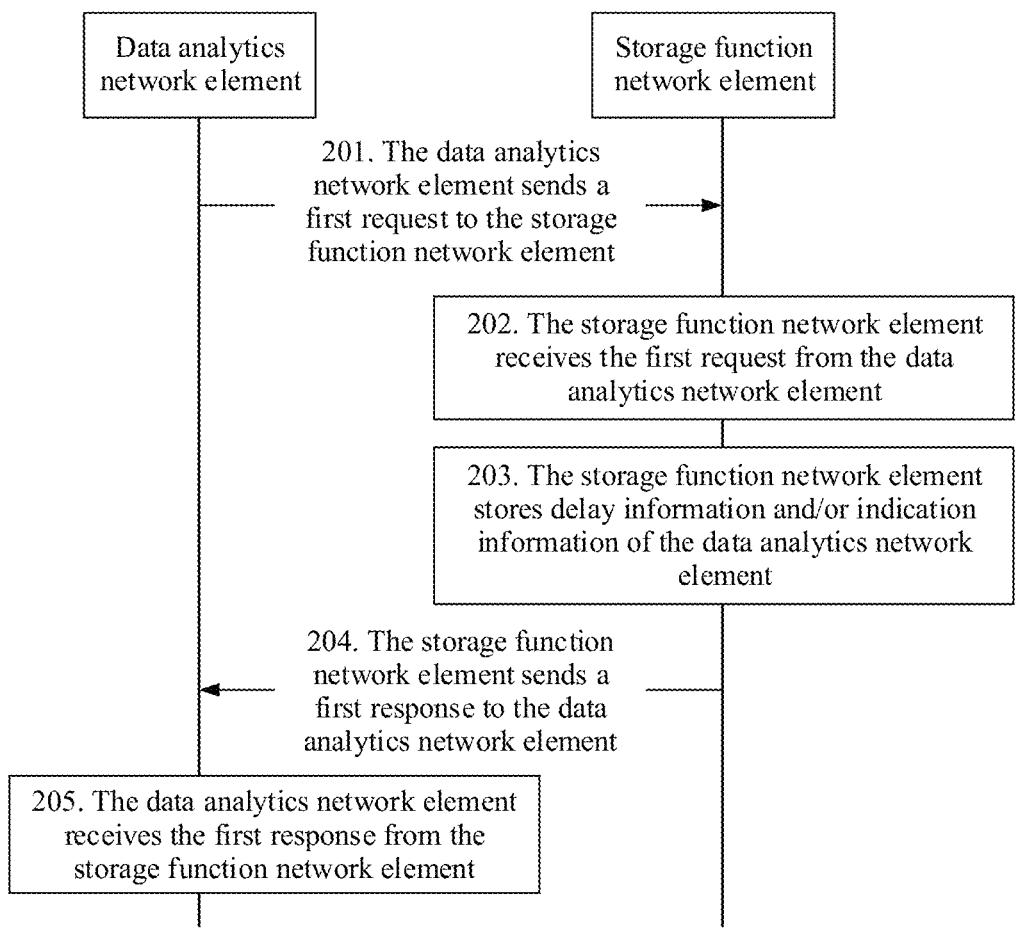
FIG. 2 to FIG. 8 each are a schematic block flowchart of a communication method according to an embodiment of this application.

The following uses a communication method performed between different network elements as an example for detailed description. Refer to FIG. 2. A communication method provided in an embodiment of this application may include the following steps.

201. A data analytics network element sends a first request to a storage function network element.

The first request includes delay information and/or indication information. The delay information includes one or more of the following information: a collection delay of first data, an inference delay of a data analytics result of the first data, and a transfer delay of the data analytics result. The indication information indicates that the data analytics network element supports analyzing data within a specified delay. The first request is used to store the delay information and/or the indication information into the storage function network element.

The data analytics network element first determines the delay information, or determines the indication information, or determines the delay information and the indication information. The delay information may also be referred to as a data analytics delay. The delay information includes one or more of the following information: the collection delay of the first data, the inference delay of the data analytics result of the first data, and the transfer delay of the data analytics result. The first data is data analyzed by the data analytics network element. The collection delay of the first data is duration occupied by the data analytics network element to collect the first data. The inference delay of the data analytics result is duration occupied by the data analytics network element to perform inference on the first data to obtain the data analytics result. The transfer delay of the data analytics result is duration occupied by the data analytics network element to transfer the data analytics result. The data analytics network element may determine, based on the collection delay of the first data, the inference delay of the data analytics result of the first data, and the transfer delay of the data analytics result, a delay occupied in an entire data analytics process.

For example, in this embodiment of this application, the first request sent by the data analytics network element may be a registration request, that is, the data analytics network element requests to register with the storage function network element.

In some embodiments of this application, the first request further includes an analytics identifier. The delay information is delay information corresponding to the analytics identifier. The indication information is indication information corresponding to the analytics identifier.

The data analytics network element may further include the analytics identifier in the first request, so that both the delay information and the indication information may correspond to the analytics identifier. Therefore, the delay information and the indication information of the data analytics network element may be determined by using the analytics identifier corresponding to the data analytics network element.

In some embodiments of this application, the delay information is determined based on an area in which the data analytics network element is located, a network topology to which the data analytics network element belongs, and a hardware capability supported by the data analytics network element.

The delay information of the data analytics network element relates to a parameter of the data analytics network element. For example, at least one parameter of the area in which the data analytics network element is located, the network topology to which the data analytics network element belongs, and the hardware capability supported by the data analytics network element may be used to determine the delay information. In this embodiment of this application, the delay information corresponding to the data analytics network element may be determined by using the parameter of the data analytics network element, so that the data analytics network element can determine the delay of the entire data analytics process.

In some embodiments of this application, the communication method performed by the data analytics network element further includes the following.

The data analytics network element determines the inference delay of the data analytics result based on the first data.

Specific duration needs to be occupied by the data analytics network element to analyze the first data. For example, the data analytics network element analyzes the first data to generate the data analytics result, and duration needed by the data analytics network element to generate the data analytics result is the inference delay of the data analytics result.

For example, the data analytics network element first determines the inference delay based on a trained model, in other words, the data analytics network element inputs inference data into a model to generate an inference result and generate a delay of the data analytics result. The delay mainly relates to the hardware capability of the data analytics network element.

202. The storage function network element receives the first request from the data analytics network element.

The first request includes the delay information and/or the indication information. The delay information includes one or more of the following information: the collection delay of the first data, the inference delay of the data analytics result of the first data, and the transfer delay of the data analytics result. The indication information indicates that the data analytics network element supports analyzing the first data within the specified delay. The first request is used to store the delay information and/or the indication information into the storage function network element.

The storage function network element may obtain the delay information of the data analytics network element by using the first request. For example, the storage function network element obtains the collection delay of the first data of the data analytics network element, the inference delay of the data analytics result of the first data, and the transfer delay of the data analytics result. The storage function network element may determine, by using the collection delay of the first data, the inference delay of the data analytics result of the first data, and the transfer delay of the data analytics result, the delay occupied in the entire data analytics process of the data analytics network element. Alternatively, the storage function network element obtains the indication information of the data analytics network element. The indication information indicates that the data analytics network element supports analyzing the first data within the specified delay. For example, the indication information indicates that the data analytics network element supports real-time data analytics, or the indication information indicates that the data analytics network element supports semi-real-time data analytics. The storage function network element determines, based on the indication information provided by each data analytics network element, that each data analytics network element supports analyzing data within the specified delay, so that the storage function network element can return, to a consumer network function network element when the consumer network function network element requests a data analytics network element, a data analytics network element that meets a specific delay requirement.

203. The storage function network element stores the delay information and/or the indication information of the data analytics network element. For example, the storage function network element registers the data analytics network element with the storage function network element.

204. The storage function network element sends a first response to the data analytics network element. The first response indicates, to the data analytics network element, that the delay information and/or the indication information are/is successfully stored.

205. The data analytics network element receives the first response from the storage function network element. The first response indicates, to the data analytics network element, that the delay information and/or the indication information are/is successfully stored.

After storing the first data, the storage function network element sends the first response to the data analytics network element, so that the data analytics network element can determine, based on the first response, that the delay information and/or the indication information are/is successfully stored into the storage function network element.

Figure 3:
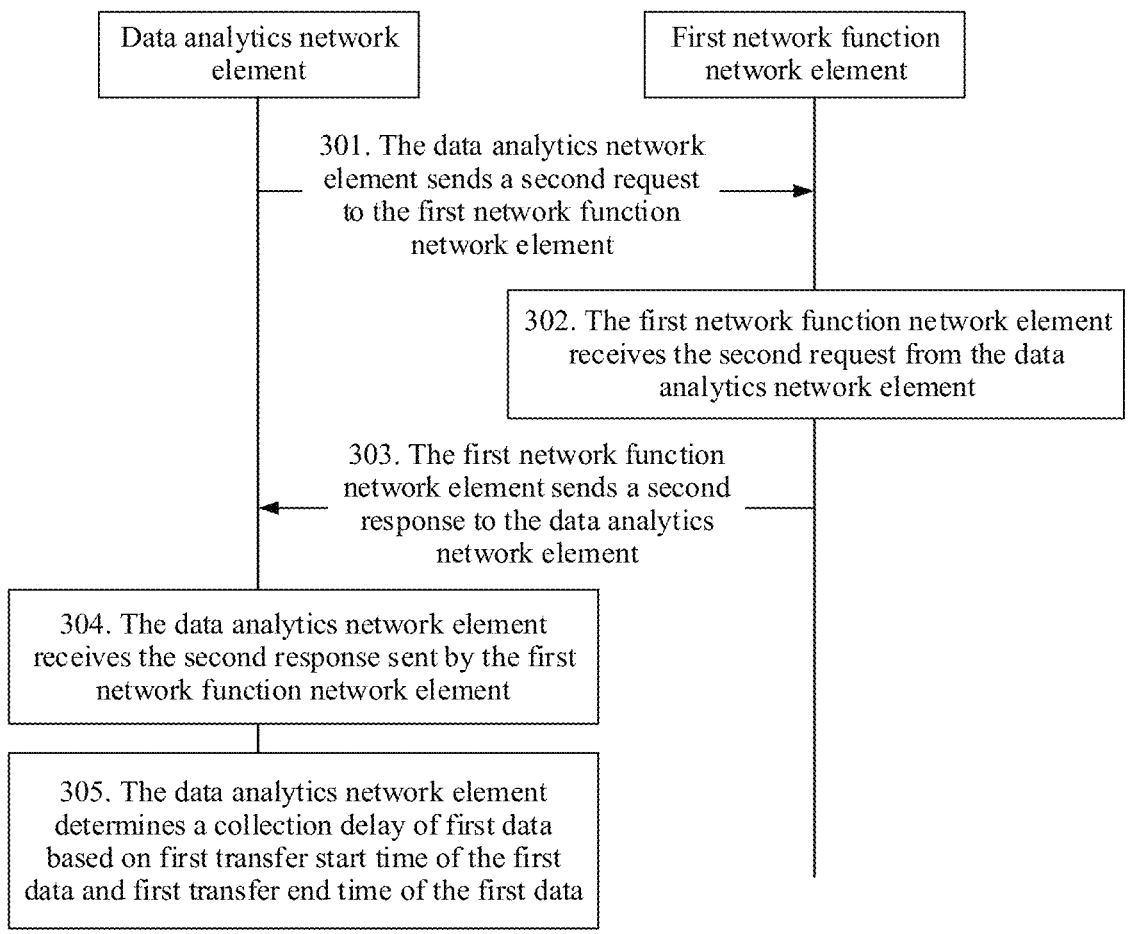

Refer to FIG. 3. An embodiment of this application provides a communication method. For a part of the communication method that is the same as that in the embodiment in FIG. 2, refer to the descriptions of the embodiment in FIG. 2. The method may include the following steps.

301. A data analytics network element sends a second request to a first network function network element. The second request is used to request first data.

When the data analytics network element needs to analyze the first data, the data analytics network element may send the second request to the first network function network element, to request the first network function network element to send the first data.

302. The first network function network element receives the second request from the data analytics network element.

The first network function network element stores the first data.

303. The first network function network element sends a second response to the data analytics network element.

304. The data analytics network element receives the second response sent by the first network function network element. The second response includes the first data and first transfer start time of the first data. The first transfer start time is start time at which the first network function network element transfers the first data.

305. The data analytics network element determines a collection delay of the first data based on the first transfer start time of the first data and first transfer end time of the first data. The first transfer end time is time at which the data analytics network element completes receiving the first data from the first network function network element.

For example, the collection delay of the first data may be equal to the first transfer end time of the first data minus the first transfer start time of the first data.

Figure 4:
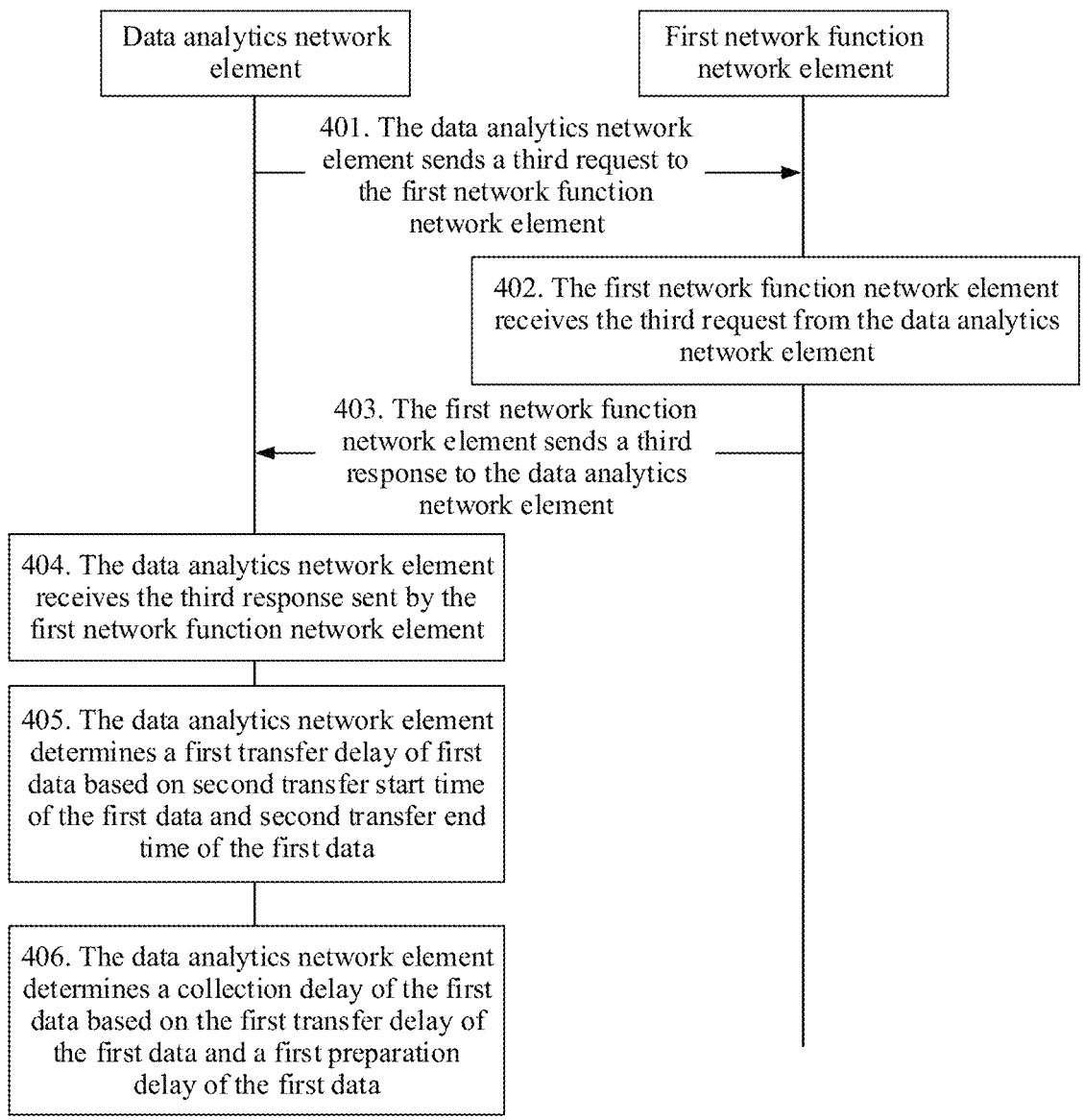

Refer to FIG. 4. An embodiment of this application provides a communication method. For a part of the communication method that is the same as that in the embodiments in FIG. 2 and FIG. 3, refer to the descriptions of the embodiments in FIG. 2 and FIG. 3. The method may include the following steps.

401. A data analytics network element sends a third request to a first network function network element. The third request is used to request first data.

When the data analytics network element needs to analyze the first data, the data analytics network element may send the third request to the first network function network element, to request the first network function network element to send the first data.

402. The first network function network element receives the third request from the data analytics network element.

403. The first network function network element sends a third response to the data analytics network element.

404. The data analytics network element receives the third response sent by the first network function network element. The third response includes the first data, second transfer start time of the first data, and a first preparation delay of the first data. The second transfer start time is start time at which the first network function network element transfers the first data. The first preparation delay is duration occupied by the first network function network element to prepare the first data.

The first network function network element needs to occupy specific duration to prepare the first data. For example, the first preparation delay is duration occupied by the first network function network element to prepare the first data. The third response includes the first preparation delay.

The first network function network element may be a data repository device.

When the first data is stored in the first network function network element, the first preparation delay of the first data includes a query delay of the first data. The query delay of the first data is duration occupied by the first network function network element to obtain the first data through query based on the third request.

For example, the data repository device needs to occupy specific duration to query the data repository device based on the second request. The first preparation delay of the first data is equal to the query delay of the first data.

405. The data analytics network element determines a first transfer delay of the first data based on the second transfer start time of the first data and second transfer end time of the first data. The second transfer end time is time at which the data analytics network element completes receiving the first data from the first network function network element.

For example, a transfer delay of the first data is equal to the first transfer end time of the first data minus the first transfer start time of the first data.

406. The data analytics network element determines a collection delay of the first data based on the first transfer delay of the first data and the first preparation delay of the first data.

The data analytics network element determines the collection delay of the first data based on the first transfer delay of the first data and the first preparation delay of the first data. For example, the collection delay of the first data is equal to the first transfer delay of the first data plus the first preparation delay of the first data. In this way, the data analytics network element can accurately obtain the collection delay of the first data.

Figure 5A:
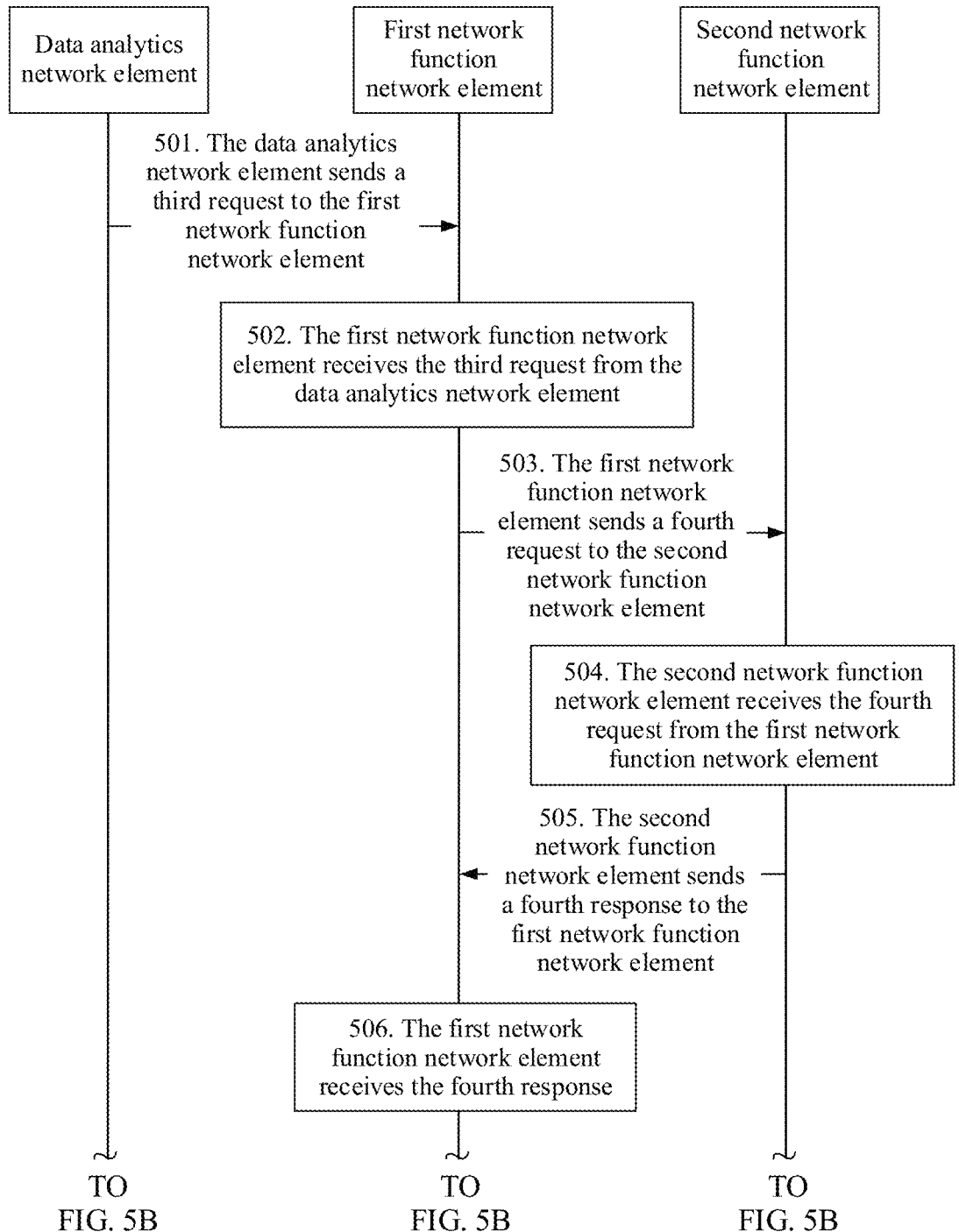
Figure 5B:
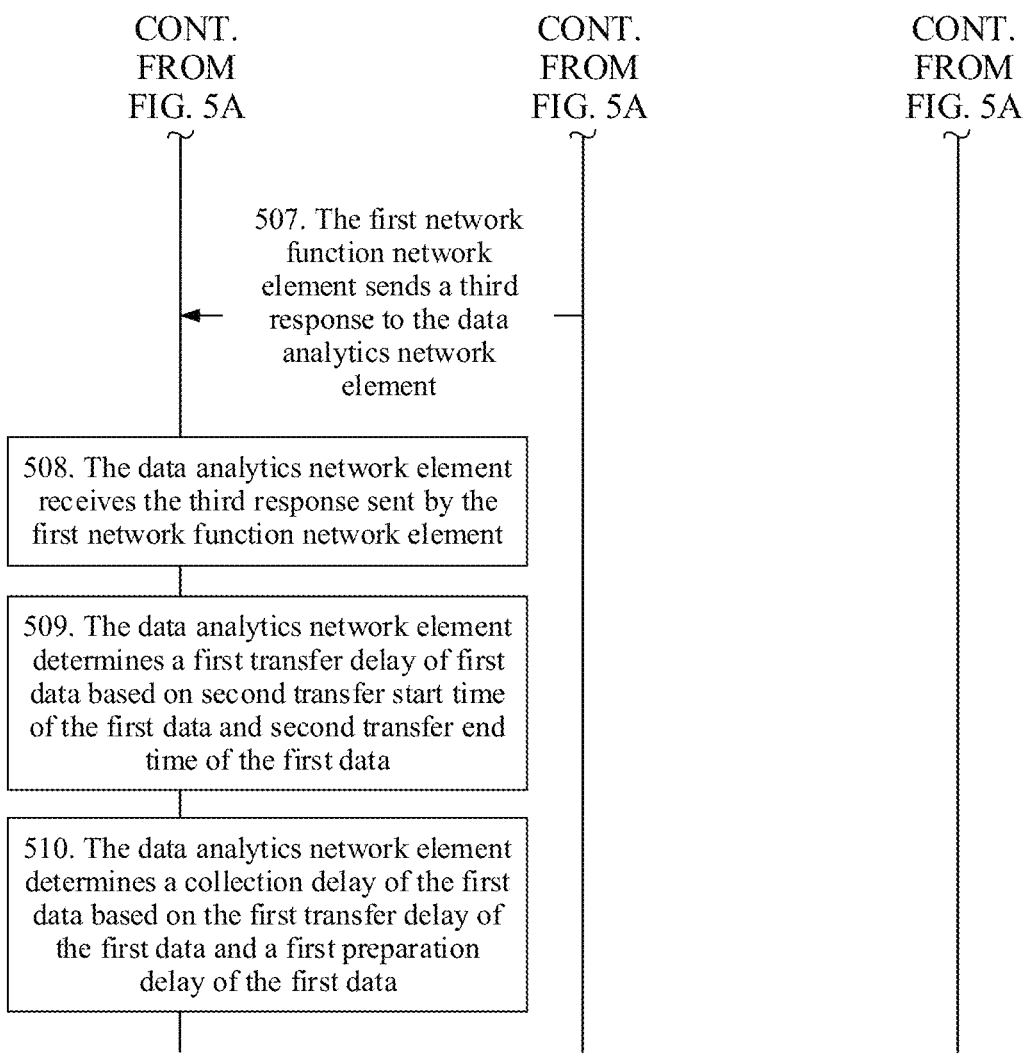

Refer to FIG. 5A and FIG. 5B. An embodiment of this application provides a communication method. For a part of the communication method that is the same as that in the embodiments in FIG. 2 to FIG. 4, refer to the descriptions of the embodiments in FIG. 2 to FIG. 4. The method may include the following steps.

501. A data analytics network element sends a third request to a first network function network element. The third request is used to request first data.

502. The first network function network element receives the third request from the data analytics network element.

503. When the first data is not stored in the first network function network element, the first network function network element sends a fourth request to the second network function network element. The fourth request is used to request the first data.

504. The second network function network element receives the fourth request from the first network function network element.

505. The second network function network element sends a fourth response to the first network function network element. The fourth response includes the first data and third transfer start time.

506. The first network function network element receives the fourth response.

The first network function network element is a first network function network element.

When the first data is not stored in the first network function network element, a first preparation delay is obtained by the first network function network element based on the third transfer start time of the first data and third transfer end time of the first data.

The first network function network element is configured to send the fourth request to the second network function network element. The fourth request is used to request the first data.

The second network function network element is configured to send the fourth response to the first network function network element. The fourth response includes the first data and the third transfer start time.

The third transfer start time is start time at which the second network function network element transfers the first data.

The third transfer end time is time at which the first network function network element completes receiving the first data from the second network function network element.

507. The first network function network element sends a third response to the data analytics network element.

508. The data analytics network element receives the third response sent by the first network function network element. The third response includes the first data, second transfer start time of the first data, and the first preparation delay of the first data. The second transfer start time is start time at which the first network function network element transfers the first data. The first preparation delay is duration occupied by the first network function network element to prepare the first data.

509. The data analytics network element determines a first transfer delay of the first data based on the second transfer start time of the first data and second transfer end time of the first data. The second transfer end time is time at which the data analytics network element completes receiving the first data from the first network function network element.

For example, the first transfer delay of the first data is equal to the second transfer end time of the first data minus the second transfer start time of the first data.

510. The data analytics network element determines a collection delay of the first data based on the first transfer delay of the first data and the first preparation delay of the first data.

For example, the collection delay of the first data is equal to the first preparation delay of the first data plus the first transfer delay of the first data.

In this embodiment of this application, the first preparation delay is duration occupied by the first network function network element to prepare the first data, and the third response includes the first preparation delay. The data analytics network element determines the collection delay of the first data based on the first transfer delay of the first data and the first preparation delay of the first data, so that the data analytics network element can accurately obtain the collection delay of the first data.

Figure 6A:
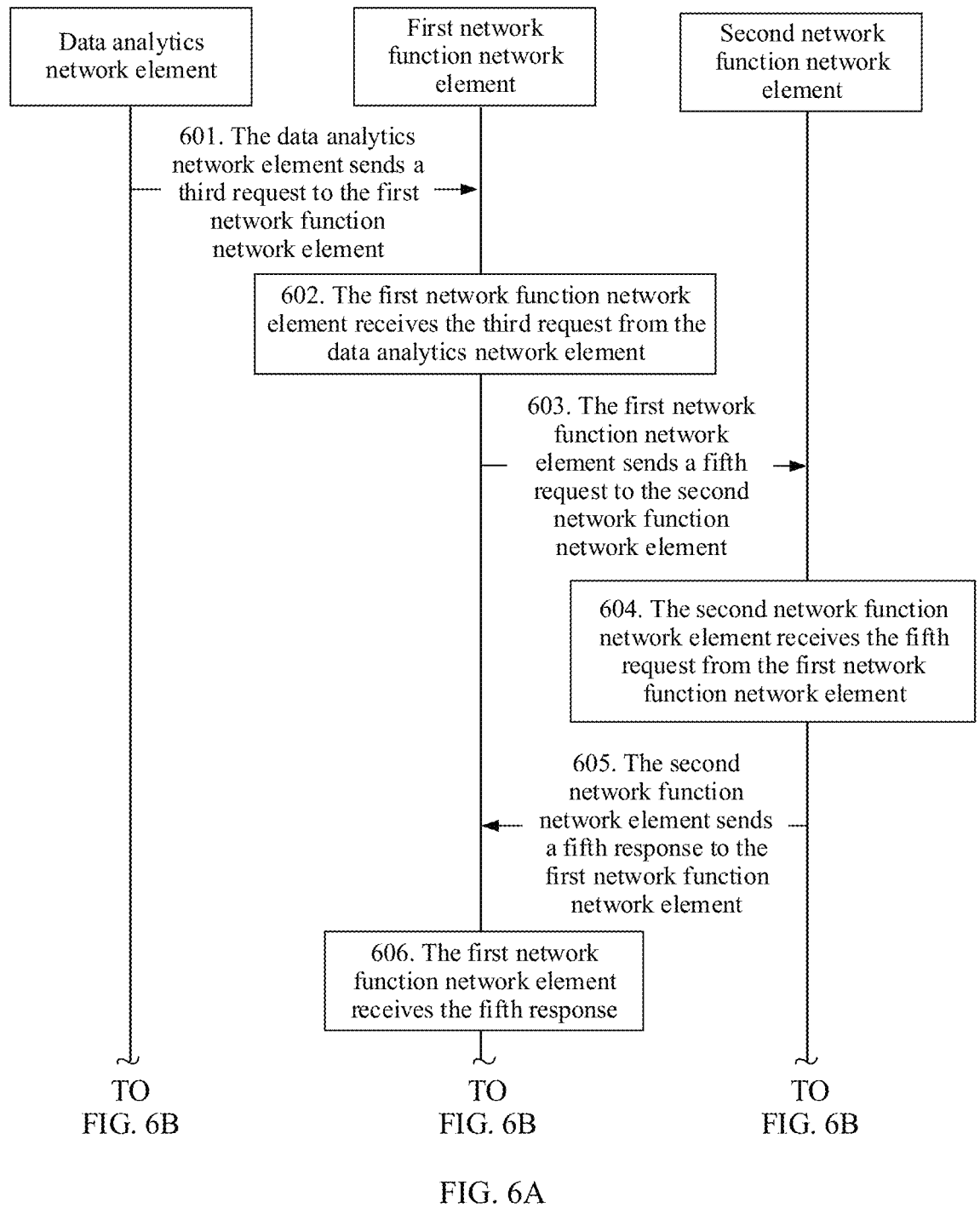
Figure 6B:
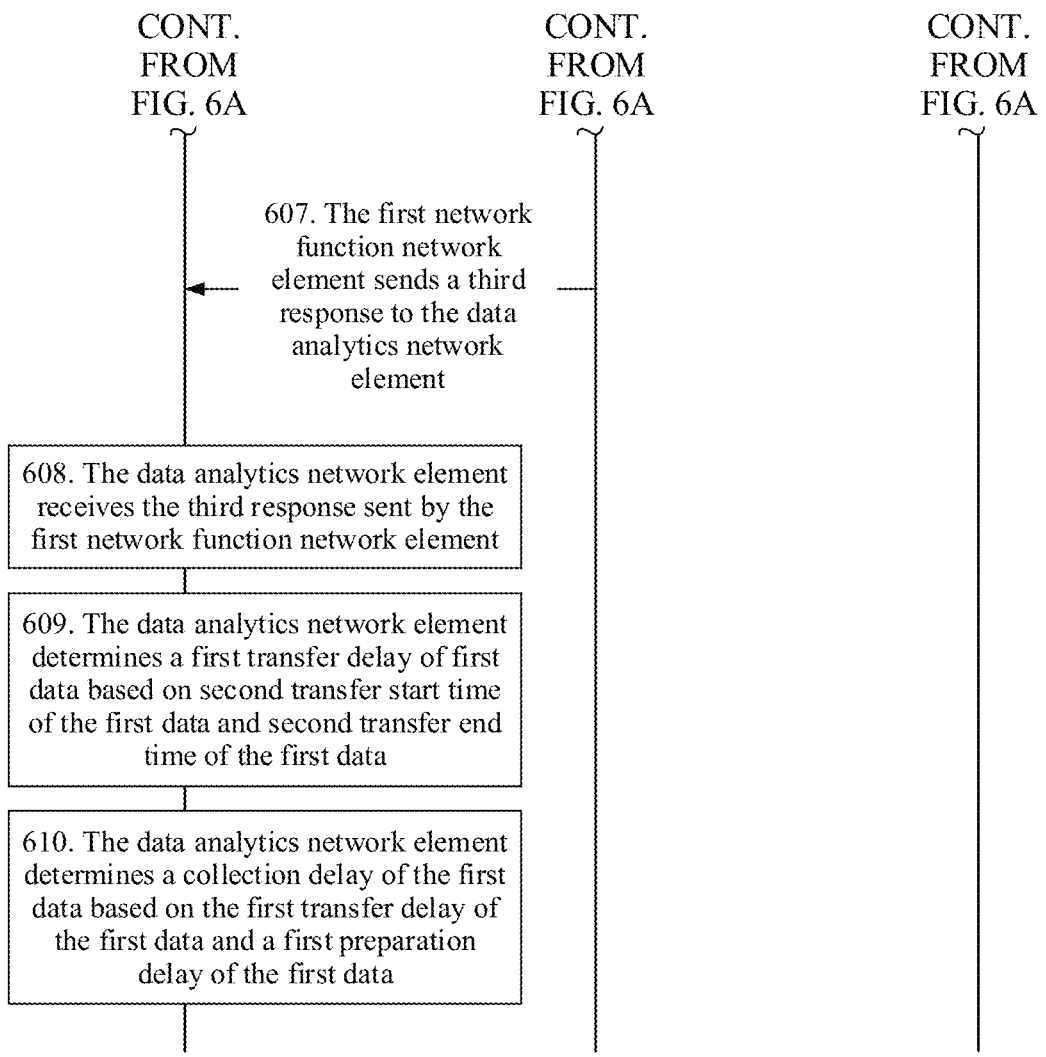

Refer to FIG. 6A and FIG. 6B. An embodiment of this application provides a communication method. For a part of the communication method that is the same as that in the embodiments in FIG. 2 to FIG. 5A and FIG. 5B, refer to the descriptions of the embodiments in FIG. 2 to FIG. 5A and FIG. 5B. The method may include the following steps.

601. A data analytics network element sends a third request to a first network function network element. The third request is used to request first data.

602. The first network function network element receives the third request from the data analytics network element.

603. When the first data is not stored in a data repository device, the first network function network element sends a fifth request to a second network function network element. The fifth request is used to request the first data.

604. The second network function network element receives the fifth request from the first network function network element.

605. The second network function network element sends a fifth response to the first network function network element. The fifth response includes the first data, fourth transfer start time, and a second preparation delay of the first data.

606. The first network function network element receives the fifth response.

The first network function network element may be the data repository device.

When the first data is not stored in the data repository device, a first preparation delay is obtained by the first network function network element based on the fourth transfer start time of the first data, fourth transfer end time of the first data, and the second preparation delay of the first data.

For example, the first preparation delay is equal to the fourth transfer end time of the first data minus the fourth transfer start time of the first data plus the second preparation delay of the first data.

The first network function network element is configured to send the fifth request to the second network function network element. The fifth request is used to request the first data.

The second network function network element is configured to send the fifth response to the first network function network element. The fifth response includes the first data, the fourth transfer start time, and the second preparation delay of the first data.

The fourth transfer start time is start time at which the second network function network element transfers the first data.

The fourth transfer end time is time at which the first network function network element completes receiving the first data from the second network function network element.

The second preparation delay is duration occupied by the second network function network element to determine the first data.

607. The first network function network element sends a third response to the data analytics network element.

608. The data analytics network element receives the third response sent by the first network function network element. The third response includes the first data, second transfer start time of the first data, and the first preparation delay of the first data. The second transfer start time is start time at which the first network function network element transfers the first data. The first preparation delay is obtained by the first network function network element based on the fourth transfer start time of the first data, the fourth transfer end time of the first data, and the second preparation delay of the first data.

609. The data analytics network element determines a first transfer delay of the first data based on the second transfer start time of the first data and second transfer end time of the first data. The second transfer end time is time at which the data analytics network element completes receiving the first data from the first network function network element.

For example, the first transfer delay of the first data is equal to the second transfer end time of the first data minus the second transfer start time of the first data.

610. The data analytics network element determines a collection delay of the first data based on the first transfer delay of the first data and the first preparation delay of the first data.

For example, the collection delay of the first data is equal to the first preparation delay of the first data plus the first transfer delay of the first data.

In the foregoing solution, when the first network function network element does not store the first data, the first network function network element may request the first data from the second network function network element. A preparation delay of preparing the first data by the second network function network element is the second preparation delay. In this case, the first preparation delay obtained by the first network function network element includes the second preparation delay. Finally, the data analytics network element determines the collection delay of the first data based on the first transfer delay of the first data and the first preparation delay of the first data. This resolves a problem that the data analytics network element cannot determine the collection delay of the first data. In this way, a network element that uses the data analytics result predetermines, in advance, a delay requirement that can be met by the data analytics network element.

Figure 7:
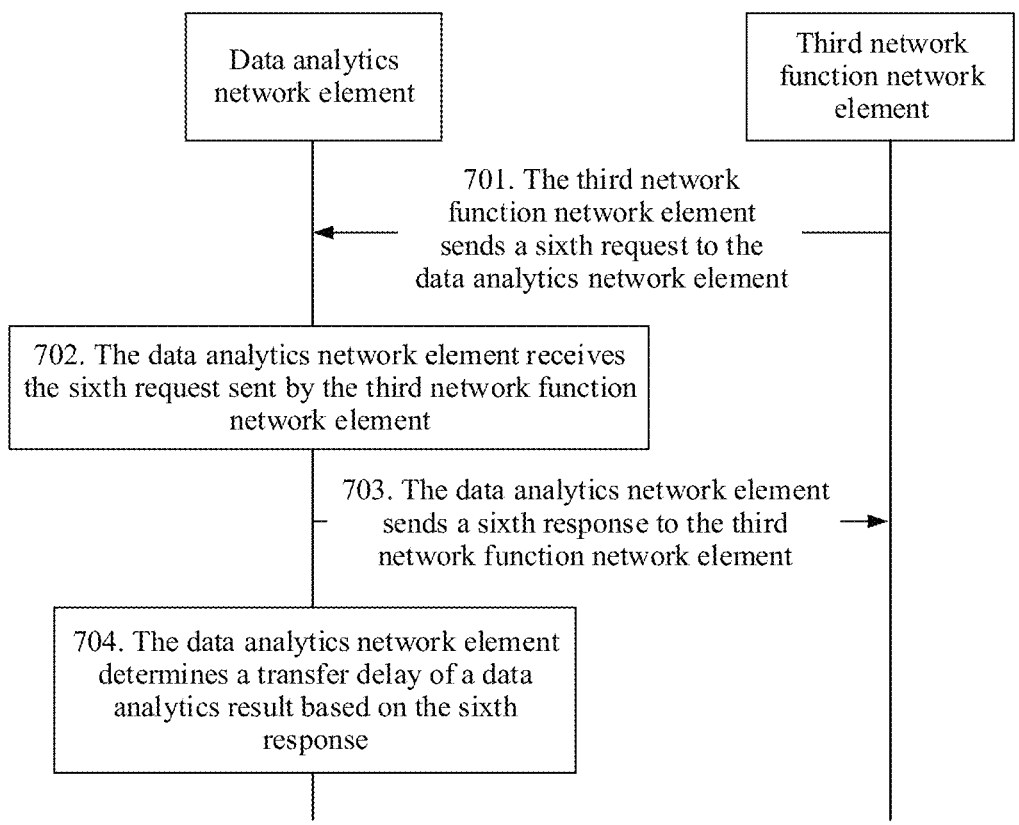

Refer to FIG. 7. An embodiment of this application provides a communication method. For a part of the communication method that is the same as that in the embodiments in FIG. 2 to FIG. 6A and FIG. 6B, refer to the descriptions of the embodiments in FIG. 2 to FIG. 6A and FIG. 6B. The method may include the following steps.

701. A third network function network element sends a sixth request to a data analytics network element.

702. The data analytics network element receives the sixth request sent by the third network function network element. The sixth request is used to request a data analytics result.

703. The data analytics network element sends a sixth response to the third network function network element. The sixth response includes the data analytics result.

704. The data analytics network element determines a transfer delay of the data analytics result based on the sixth response.

The third network function network element is a network element requesting the data analytics result. For example, the third network function network element is a consumer NF network element. For example, when the third network function network element needs to obtain the data analytics result, the third network function network element sends the sixth request to the data analytics network element.

Further, in some embodiments of this application, that the data analytics network element determines a transfer delay of the data analytics result based on the sixth response includes the following.

The data analytics network element receives transfer end time of the data analytics result that is sent by the third network function network element. The transfer end time of the data analytics result is time at which the third network function network element completes sending the data analytics result.

The data analytics network element determines the transfer delay of the data analytics result based on transfer start time of the data analytics result and the transfer end time of the data analytics result. The transfer start time of the data analytics result is start time at which the data analytics network element sends the data analytics result.

The data analytics network element obtains the transfer end time of the data analytics result from the third network function network element, and then the data analytics network element obtains the transfer delay of the data analytics result by itself. For example, the transfer delay of the data analytics result is equal to the transfer end time of the data analytics result minus the transfer start time of the data analytics network element based on the data analytics result. This resolves a problem that the data analytics network element cannot determine the transfer delay of the data analytics result.

Further, in some embodiments of this application, that the data analytics network element determines a transfer delay of the data analytics result based on the sixth response includes the following.

The data analytics network element sends transfer start time of the data analytics result to the third network function network element. The transfer start time of the data analytics result is start time at which the data analytics network element sends the data analytics result.

The data analytics network element receives the transfer delay of the data analytics result that is sent by the third network function network element. The transfer delay of the data analytics result is determined by the third network function network element based on the transfer start time of the data analytics result and transfer end time of the data analytics result. The transfer end time of the data analytics result is time at which the third network function network element completes sending the data analytics result.

The data analytics network element may send the transfer start time of the data analytics result to the third network function network element, and then the third network function network element obtains the transfer delay of the data analytics result by itself. For example, the transfer delay of the data analytics result is equal to the transfer end time of the data analytics result minus the transfer start time of the data analytics network element based on the data analytics result. The data analytics network element receives the transfer delay of the data analytics result that is sent by the third network function network element, to resolve the problem that the data analytics network element cannot determine the transfer delay of the data analytics result.

Figure 8:
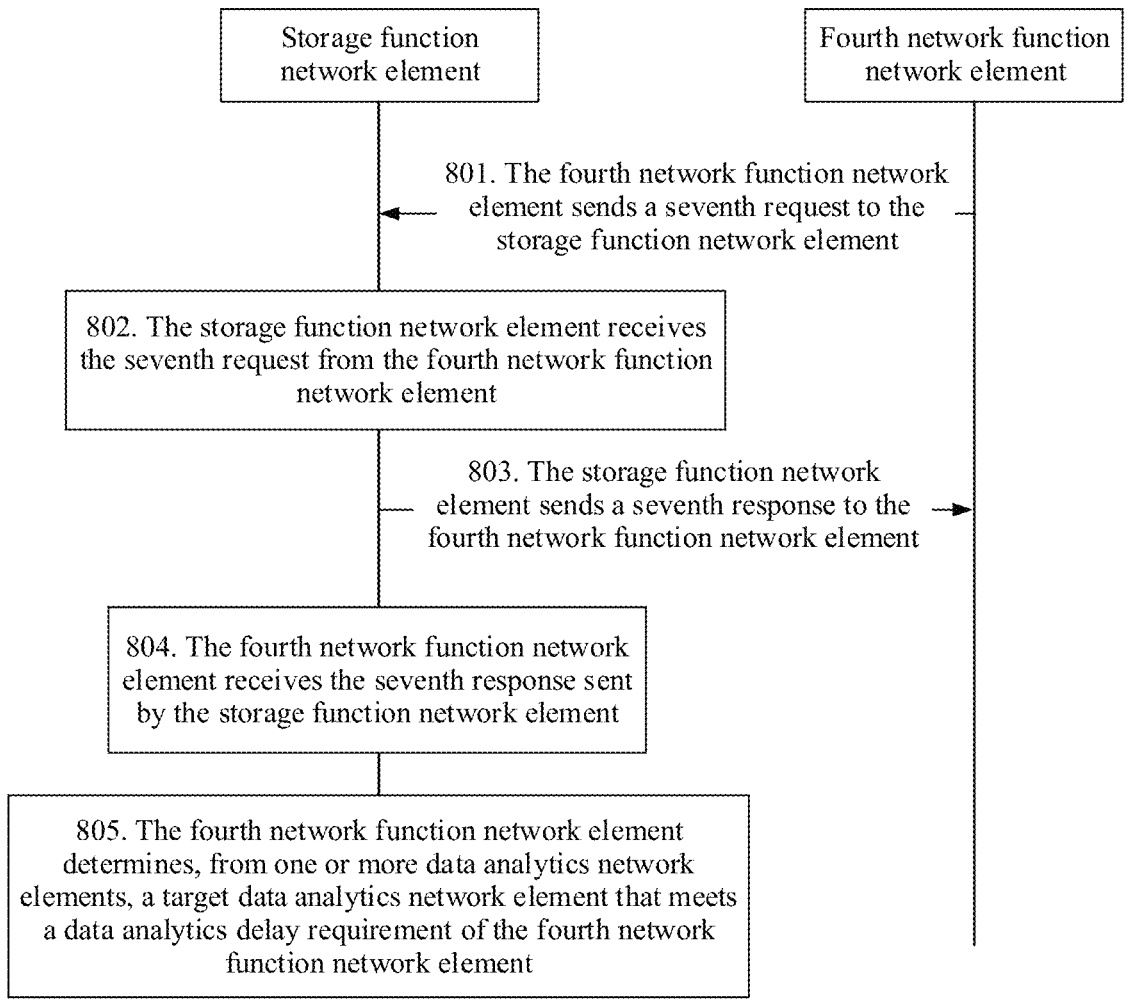

Refer to FIG. 8. An embodiment of this application provides a communication method. For a part of the communication method that is the same as that in the embodiments in FIG. 2 to FIG. 7, refer to the descriptions of the embodiments in FIG. 2 to FIG. 7. The method may include the following steps.

801. A fourth network function network element sends a seventh request to a storage function network element. The seventh request is used to request a data analytics network element.

The fourth network function network element needs to determine a data analytics network element to request a data analytics result. The fourth network function network element sends the seventh request to the storage function network element.

802. The storage function network element receives the seventh request from the fourth network function network element. The seventh request is used to request the data analytics network element.

803. The storage function network element sends a seventh response to the fourth network function network element. The seventh response includes one or more data analytics network elements.

A plurality of data analytics network elements are pre-registered in the storage function network element. After the storage function network element receives the seventh request, the storage function network element may generate the seventh response. The seventh response includes the one or more data analytics network elements. The data analytics network element in the seventh response is a data analytics network element returned by the storage function network element to the fourth network function network element.

804. The fourth network function network element receives the seventh response sent by the storage function network element. The seventh response includes the one or more data analytics network elements. The one or more data analytics network elements respectively correspond to delay information.

The fourth network function network element receives the seventh response. The fourth network function network element obtains the one or more data analytics network elements in the seventh response. The one or more data analytics network elements respectively correspond to the delay information. For example, the seventh response may include the one or more data analytics network elements respectively corresponding to the delay information, or the seventh response includes the one or more data analytics network elements that support analyzing data within a specified delay.

In some embodiments of this application, the seventh request includes a data analytics delay requirement of the fourth network function network element.

That the storage function network element sends a seventh response to the fourth network function network element includes the following.

The storage function network element determines, based on delay information corresponding to a data analytics network element, the one or more data analytics network elements that meet the data analytics delay requirement.

The storage function network element sends the seventh response to the fourth network function network element. The seventh response includes the one or more data analytics network elements that meet the data analytics delay requirement.

The storage function network element obtains the data analytics delay requirement of the fourth network function network element, and the storage function network element pre-stores the delay information corresponding to each data analytics network element. Therefore, the storage function network element may filter, based on the data analytics delay requirement, the delay information corresponding to each data analytics network element, to determine the one or more data analytics network elements that meet the data analytics delay requirement. The storage function network element sends the seventh response to the fourth network function network element. The seventh response carries the one or more data analytics network elements that meet the data analytics delay requirement, so that the fourth network function network element determines the one or more data analytics network elements that meet the data analytics delay requirement.

In some embodiments of this application, that the storage function network element sends a seventh response to the fourth network function network element includes the following.

The storage function network element determines the one or more data analytics network elements that support analyzing data within a specified delay.

The storage function network element sends the seventh response to the fourth network function network element. The seventh response includes the one or more data analytics network elements that support analyzing data within the specified delay.

The storage function network element obtains the one or more data analytics network elements that support analyzing data within the specified delay, and the storage function network element sends the seventh response to the fourth network function network element. The seventh response includes the one or more data analytics network elements that support analyzing data within the specified delay, so that the fourth network function network element determines the one or more data analytics network elements that support analyzing data within the specified delay, and then the fourth network function network element determines a target data analytics network element.

805. The fourth network function network element determines, from the one or more data analytics network elements, the target data analytics network element that meets a data analytics delay requirement of the fourth network function network element.

The fourth network function network element may preset the data analytics delay requirement of the fourth network function network element, and then determine the target data analytics network element from the one or more data analytics network elements in the seventh response based on the data analytics delay requirement. The target data analytics network element is a data analytics network element from which the fourth network function network element requests the data analytics result. Then, the fourth network function network element may communicate with the target data analytics network element. Delay information of the target data analytics network element meets the data analytics delay requirement of the fourth network function network element.

In some embodiments of this application, that the fourth network function network element determines, from the one or more data analytics network elements, the target data analytics network element that meets a data analytics delay requirement of the fourth network function network element includes the following.

The fourth network function network element determines, from the seventh response, the delay information respectively corresponding to the one or more data analytics network elements.

The fourth network function network element determines the target data analytics network element based on the delay information respectively corresponding to the one or more data analytics network elements and the data analytics delay requirement.

The fourth network function network element may obtain the delay information corresponding to each data analytics network element, and may filter, based on the data analytics delay requirement, the delay information corresponding to each data analytics network element, to determine the target data analytics network element that meets the data analytics delay requirement.

In some embodiments of this application, that the fourth network function network element determines the target data analytics network element based on the seventh response includes the following.

The fourth network function network element sends the data analytics delay requirement to the one or more data analytics network elements separately.

The fourth network function network element receives a delay matching result sent by at least one data analytics network element that meets the data analytics delay requirement.

The fourth network function network element determines the target data analytics network element from the at least one data analytics network element that sends the delay matching result.

The fourth network function network element may send the data analytics delay requirement to each data analytics network element. Each data analytics network element matches with delay information of the data analytics network element based on the data analytics delay requirement. The at least one data analytics network element that meets the data analytics delay requirement sends the delay matching result to the fourth network function network element. The fourth network function network element determines the at least one data analytics network element that sends the delay matching result, and then the fourth network function network element determines the target data analytics network element.

For better understanding and implementation of the foregoing solutions in embodiments of this application, specific descriptions are provided below by using corresponding application scenarios as examples.

Figure 9:
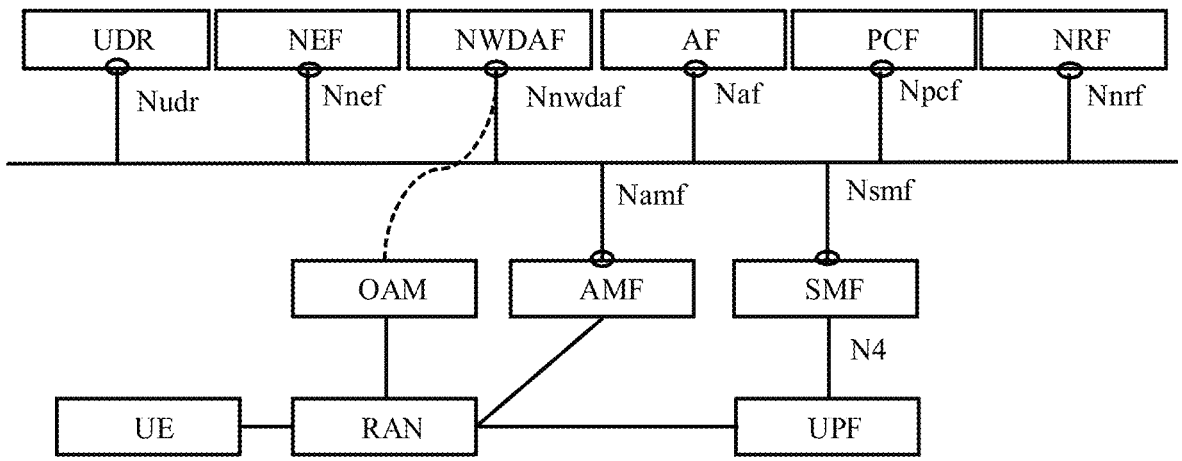
FIG. 9 is a schematic diagram of an NWDAF-based 5G network architecture according to an embodiment of this application.

FIG. 9 is a schematic diagram of a system architecture used in a communication method according to an embodiment of this application. The system architecture may include a user data repository (UDR), an NEF network element, an NWDAF network element, an AF network element, a PCF network element, an NRF network element, an operation, administration and maintenance (OAM) network element, an AMF network element, an SMF network element, a UPF network element, a RAN device, and UE.

The NWDAF may be the foregoing data analytics network element. The NWDAF is configured to determine delay information. For example, the delay information may also be referred to as an analytics delay. The analytics delay includes one or more of the following delays: a data preparation delay, a data transfer delay, an inference delay, and an analytics result transfer delay.

The NWDAF is configured to send a request 1 to the NRF. The request 1 is used to register the NWDAF with the NRF. For example, the NWDAF registers capability information (for example, information included in the request 1) supported by the NWDAF with the NRF. The request 1 includes one or more of the following information: an analytics delay, an analytics result identifier, and indication information indicating that real-time or semi-real-time data analytics is supported. The real-time or semi-real-time data analytics relates to a delay. For example, the real-time data analytics means that a response can be immediately obtained after a request is sent for analytics, and the semi-real-time data analytics means that a response is obtained a period of time (for example, five minutes) after a request is sent. The NRF stores the analytics delay or the indication information indicating that real-time or semi-real-time data analytics is supported in the request 1, and then the NRF sends a response 1 to the NWDAF. The NWDAF is configured to receive the response 1 from the NRF. The response 1 indicates that the NWDAF registers the information about the analytics delay successfully.

The NRF may be the foregoing storage function network element. The NRF is configured to receive the request 1 from the NWDAF. The request 1 is used to register the NWDAF. The request 1 includes the analytics delay, the analytics result identifier, and the indication information indicating that real-time or semi-real-time data analytics is supported. The NRF is configured to send the response 1 to the NWDAF. The response 1 indicates that the NWDAF registers the information about the analytics delay successfully. The NRF is further configured to receive a request 2 from a consumer NF. The request 2 is used to request an NWDAF. The request 2 includes an analytics delay requirement and the analytics result identifier (Analytics ID). The analytics result identifier may also be referred to as an analytics identifier, and indicates the NRF to return a data analytics result that supports a type of the analytics ID. The NRF is configured to send a response 2 to the consumer NF. The response 2 includes one or more NWDAFs.

The consumer NF may be the foregoing fourth network function network element. For example, the consumer NF directly negotiates with the NRF to determine an NWDAF that meets the delay requirement. The consumer NF is configured to send the request 2 to the NRF. The request 2 is used to request an NWDAF. The request 2 includes the analytics delay requirement and the analytics result identifier. The consumer NF is configured to receive the response 2 from the NRF. The response 2 includes one or more NWDAFs. The consumer NF is configured to select an NWDAF that meets the requirement from the one or more NWDAFs. For example, if the one or more NWDAFs included in the response 2 meet the condition, the consumer NF may randomly select an NWDAF, and then request the data analytics result from the selected NWDAF. For another example, the consumer NF first queries the NRF to obtain an NWDAF that supports real-time data analytics, and then negotiates with the NWDAF about a delay that can be met. The consumer NF sends a request 3 to the NRF. The request 3 is used to request one or more NWDAFs. The request 3 includes the indication information indicating that real-time data analytics is supported and the analytics result identifier. The consumer NF receives a response 3 from the NRF. The response 3 includes one or more NWDAFs. The consumer NF sends the analytics delay requirement to each NWDAF, determines whether each NWDAF meets the analytics delay requirement, selects an appropriate NWDAF from the NWDAFs that meet the requirement, and requests the data analytics result from the NWDAF.

In FIG. 9, the NWDAF may directly collect data from an NF (for example, the NF may be an AMF, an SMF, a UPF, or an AF). However, when a plurality of NWDAFs are deployed, if different NWDAFs request a same piece of data, the NF needs to separately provide the same piece of data for these NWDAFs, causing data transfer pressure of the NF.

Figure 10:
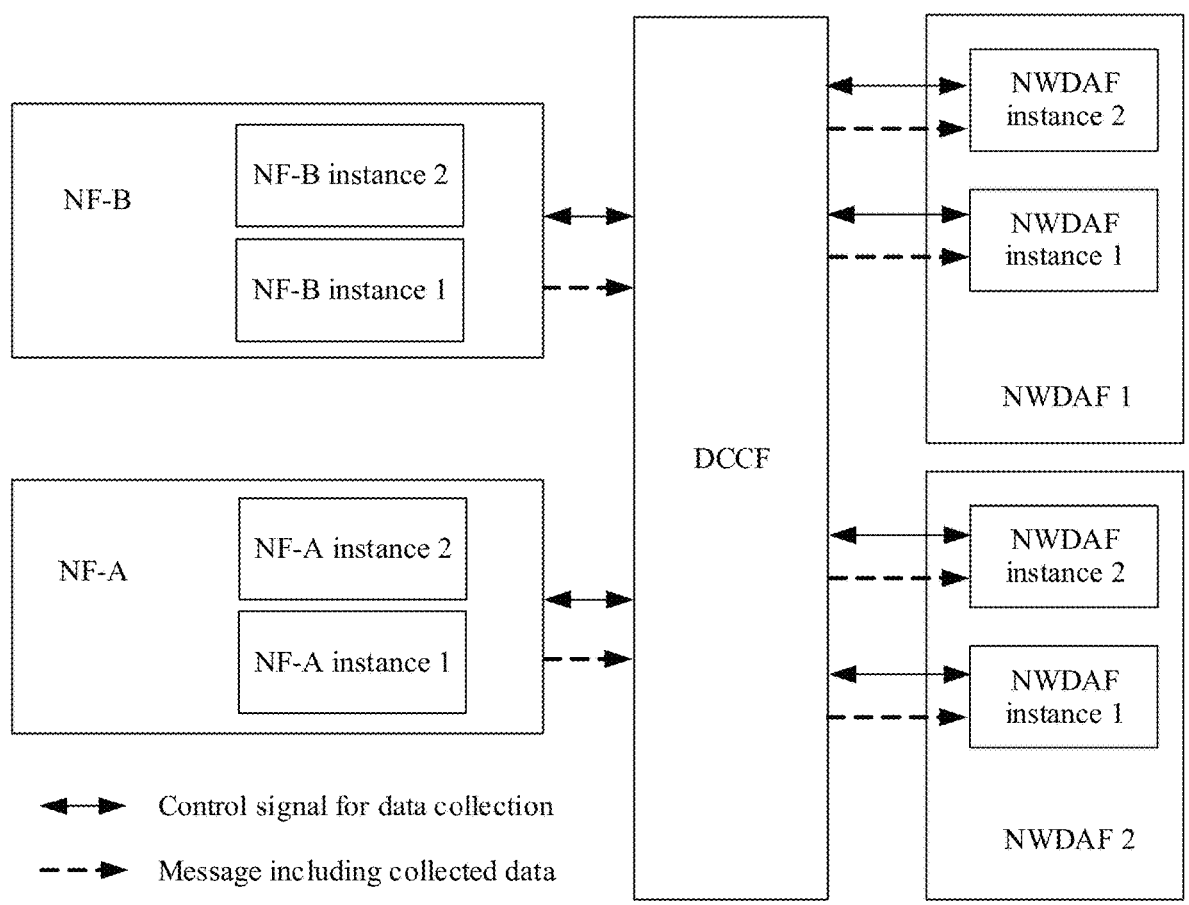
FIG. 10 is a schematic diagram of a DCCF-based data collection architecture according to an embodiment of this application.

FIG. 10 is a DCCF-based data collection architecture. An NWDAF 1 and an NWDAF 2 may request data from a DCCF. When the data is not stored in the DCCF, the DCCF may request the data from an NF-A and an NF-B. The NF-A may include an NF-A instance 1 and an NF-A instance 2. The NF-B may include an NF-B instance 1 and an NF-B instance 2. The NWDAF 1 may include an NWDAF 1 instance 1 and an NWDAF 1 instance 2. The NWDAF 2 may include an NWDAF instance 1 and an NWDAF instance 2.

The DCCF network element may be the foregoing first network function network element. When a plurality of NWDAFs are deployed, the NWDAF first requests data from the DCCF. If the data that the NWDAF requests is not stored in a local data repository of the DCCF, the DCCF further requests the data from an NF, and then the DCCF sends the data to the NWDAF. If it is determined, through data repository query, that the local data repository of the DCCF already stores the data that the NWDAF requests, the DCCF copies the data, and directly returns the data to the NWDAF. For example, it is assumed that the NWDAF 1 first requests a piece of data from the DCCF. After obtaining the piece of data, the DCCF needs to send the piece of data to the NWDAF 1, and the piece of data is also stored in the local data repository. Subsequently, the NWDAF 2 also requests the same data from the DCCF. In this case, because the local data repository of the DCCF already stores the piece of data, the DCCF may directly obtain the piece of data from the local data repository of the DCCF and send the piece of data to the NWDAF 2 without a need of requesting the piece of data from the NF. In this case, if one or more other NWDAFs request the data from the DCCF, the DCCF only needs to replicate the data and send the data to the one or more NWDAFs without a need of collecting the data from the NF. In this way, it can be ensured that the NF only needs to provide one piece of data to the DCCF. This greatly reduces data transfer pressure of the NF.

The following provides detailed descriptions by using three embodiments. The following embodiments are example descriptions of the foregoing embodiments. For content that is the same as that in the foregoing embodiments, refer to the descriptions in the foregoing method embodiments. For specific message interaction of the network elements in the foregoing embodiments, refer to descriptions in the following three embodiments.

Embodiment 1

Figure 11:
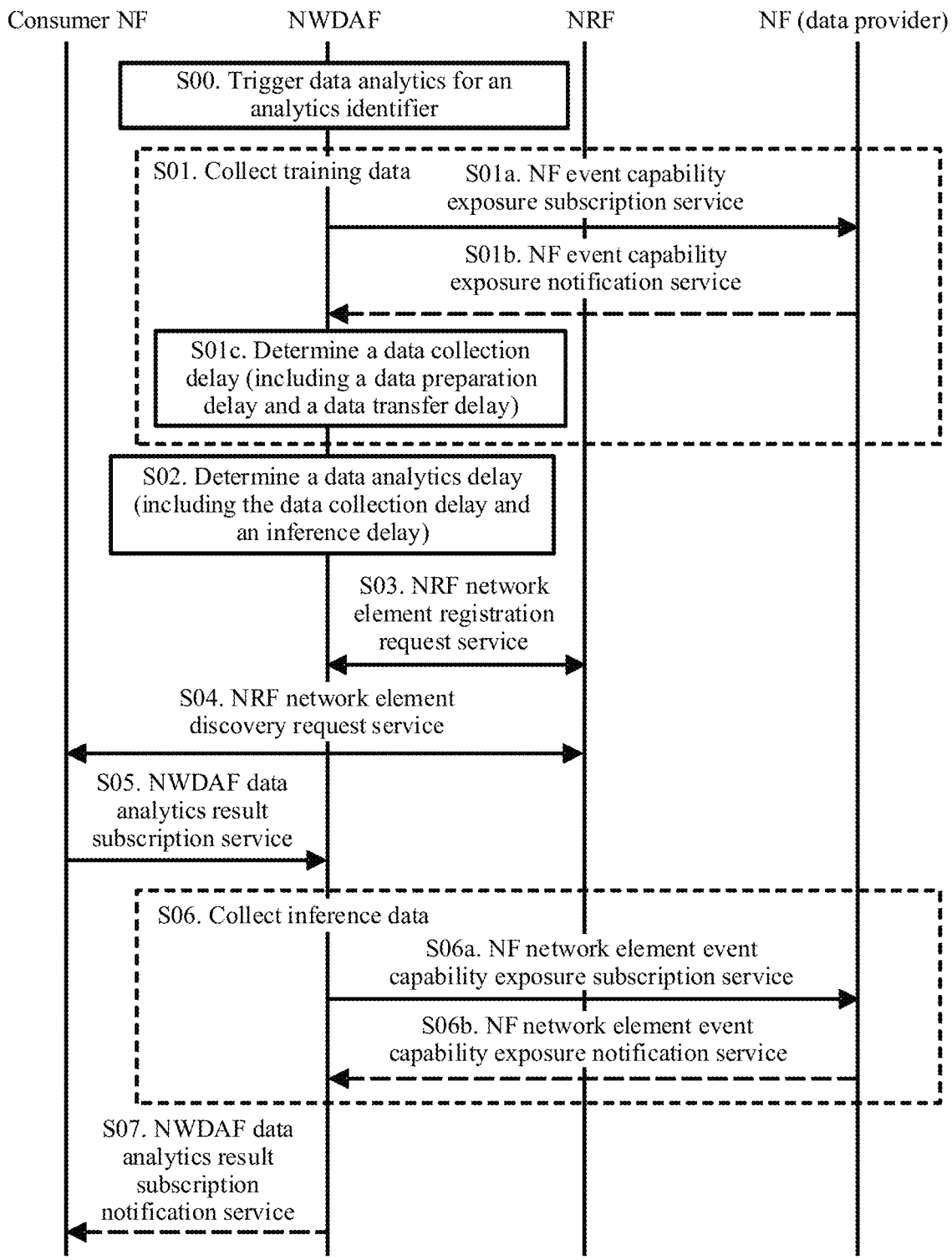
FIG. 11 is a schematic interaction diagram of a communication method in an application scenario according to an embodiment of this application.

As shown in FIG. 11, the following procedure is mainly included.

S00. An NWDAF that supports real-time data analytics triggers data analytics for an analytics identifier (Analytics ID). For example, a trigger condition for triggering the data analytics may be that the NWDAF obtains a model from a training platform and locally deploys the model. For example, the model is a machine learning model, for example, a service experience model (service experience model or service mean opinion score (MOS) model), and may represent a correspondence between service experience and a network parameter (QOS flow bit rate or QoS flow latency). The NWDAF may obtain service experience through evaluation by using the foregoing model and knowing a network parameter value of a service flow.

It should be noted that there may be one or more NWDAFs that support analytics of a same analytics ID. Different NWDAFs support different hardware capabilities and different NWDAF deployment locations. In this case, for the analytics ID, delays generated from data collection to data analytics result inference are different. Therefore, an NWDAF may be selected based on a data analytics delay requirement subsequently. The hardware capability supported by the NWDAF mainly affects an inference delay of a data analytics result. The deployment location of the NWDAF may affect an inference data collection delay.

S01. In an offline data collection process, the NWDAF determines a training data collection delay or the inference data collection delay that corresponds to the analytics ID.

S01a. The NWDAF triggers an NF event capability exposure subscription service Nnf_EventExposure_Subscribe to an NF to initiate data subscription to the NF. The service includes an event identifier (Event ID) indicating a type of data to be subscribed to.

In the data collection process, the NF records a sample data preparation delay (data preparation time), and determines start time at which sample data is sent to the NWDAF, that is, start time for data transfer.

S01b. The NF triggers an NF event capability exposure notification service Nnf_EventExposure_Notify to the NWDAF, and sends collected data to the NWDAF. The service includes the collected data, the data preparation delay, and the start time for data transfer.

S01c. After receiving the data, the NWDAF records time at which the data is received from the NF, that is, end time for data transfer; then determines a data transfer delay, where the data transfer delay=the end time for data transfer—the start time for data transfer; and finally determines a data collection delay, where the data collection delay=the data transfer delay+the data preparation delay.

S02. The NWDAF determines a data analytics delay supported by the analytics ID. Based on a trained model, the NWDAF first determines an inference delay (inference delay), in other words, the NWDAF inputs the inference data into the model to generate an inference result and generate a delay of the data analytics result. The delay mainly relates to the hardware capability of the NWDAF (for example, a memory size of the NWDAF and a quantity of graphics processing units (GPUs)). The NWDAF finally determines the data analytics delay (supported analytics delay), where the data analytics delay=the inference delay+the data collection delay.

S03. The NWDAF triggers an NRF network element registration request/response service Nnrf_NFManagement_NFRegister_Request/Rsp to an NRF, and registers the data analytics delay supported by the analytics ID with the NRF. The service includes an address of the NWDAF, a data analytics identifier Analytics ID, and a corresponding data analytics delay (supported analytics delay). Optionally, the data analytics delay may be included in a real-time communication capability information information element.

Figure 12:
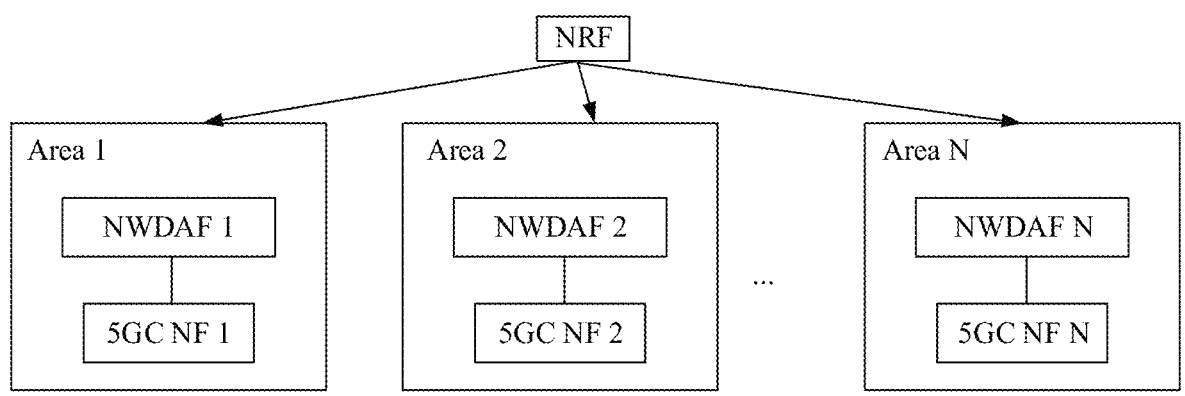
FIG. 12 is a schematic diagram of connections between an NRF and N NWDAFs according to an embodiment of this application.

As shown in FIG. 12, the NRF may be connected to N NWDAFs, which are respectively an NWDAF 1 in an area 1, an NWDAF 2 in an area 2, . . . , and an NWDAF N in an area N. An analytics ID of each NWDAF is equal to a service mean opinion score (MOS). Each NWDAF includes a specific quantity of GPUs, and each NWDAF is connected to an NF in a 5G core network. For example, the NWDAF 1 is connected to a 5GC NF 1, the NWDAF 2 is connected to a 5GC NF 2, . . . , and the NWDAF N is connected to a 5GC NF N. One or more data analytics delays of one or more NWDAFs that support analytics of a same analytics ID may be the same or different, depending on an area in which the NWDAF is located, a network topology, and a hardware capability supported by the NWDAF.

Each NWDAF may support data analytics of the analytics ID=the service MOS. For example, an area of the NWDAF 1 is a tracking area (TA) 1 to a TA 10, a quantity of GPUs of the NWDAF 1 is 3, an area of the NWDAF 2 is the TA 5 to a TA 20, a quantity of GPUs of the NWDAF 2 is 5, an area of the NWDAF 3 is the TA 1 to the TA 10, and a quantity of GPUs of the NWDAF 3 is 5. The NWDAF 1 and the NWDAF 2 have overlapping areas (the tracking area (TA) 5 to the TA 10). In other words, in the overlapping areas, both the NWDAF 1 and the NWDAF 2 can provide the service MOS. Five GPUs are more than three GPUs and have a strong parallel computing capability. Therefore, a hardware capability of the NWDAF 2 is stronger, and a delay for generating the service MOS through inference is shorter. Therefore, it is assumed that UE needs to request the service MOS in the overlapping areas, and the NWDAF 2 is recommended.

Correspondingly, if hardware capabilities of the NWDAFs are the same, an NWDAF closest to a location in which the UE requests the service MOS may be selected for data analytics, because a delay of collecting data by the NWDAF is shortened.

S04. To obtain the data analytics result corresponding to the analytics ID, a consumer NF first determines a delay requirement (expected analytics delay (or analytics delay Requirement or Desired analytics delay)) for generating the data analytics result, and then the consumer NF triggers an NRF network element discovery request/response service Nnrf_NFDiscovery_Request/Rsp to the NRF, and requests, based on the expected analytics delay, the NRF for an address of one or more NWDAFs that meet the delay requirement. The consumer NF selects an NWDAF from the one or more NWDAFs as a target NWDAF for requesting the data analytics result.

S05. The consumer NF triggers an NWDAF data analytics result subscription service Nnwdaf_AnalyticsSubscription_Subscribe to the NWDAF, and subscribes to the data analytics result corresponding to the analytics ID from the NWDAF. Optionally, the consumer NF indicates the data analytics delay requirement to the NWDAF in the service, so that the NWDAF feeds back the data analytics result in time based on the data analytics delay requirement.

S06. The NWDAF collects the inference data.

S06a. The NWDAF triggers the NF network element event capability exposure subscription service Nnf_EventExposure_Subscribe to the NF to collect the inference data. The NWDAF may indicate a data collection delay requirement (expected data collection delay) to the NF in the service.

S06b. The NF triggers the NF network element event capability exposure notification service Nnf_EventExposure_Notify (Collected data) to the NWDAF. The NF collects data in time based on the data collection delay requirement and reports the inference data.

S07. The NWDAF triggers an NWDAF data analytics result subscription notification service Nnwdaf_AnalyticsSubscription_Notify of the consumer NF, and provides, for the consumer NF, the data analytics result corresponding to the analytics ID.

It can be learned from the foregoing example that, in this embodiment of this application, information that needs to be included in the real-time communication capability information is described. The NWDAF determines the real-time communication capability information, and determines interaction between the consumer NF and the NRF, to find an appropriate NWDAF that supports real-time data analytics. In this embodiment of this application, the NF, as a data provider, needs to record the sample data preparation delay and the start time for data transfer. The NWDAF needs to record the end time for data transfer, calculate the data transfer delay, to determine the supported data analytics delay, and register the NWDAF with the NRF. The consumer NF searches, by using the NRF based on the data analytics delay requirement, for an NWDAF that meets the requirement.

Embodiment 2

Figure 13:
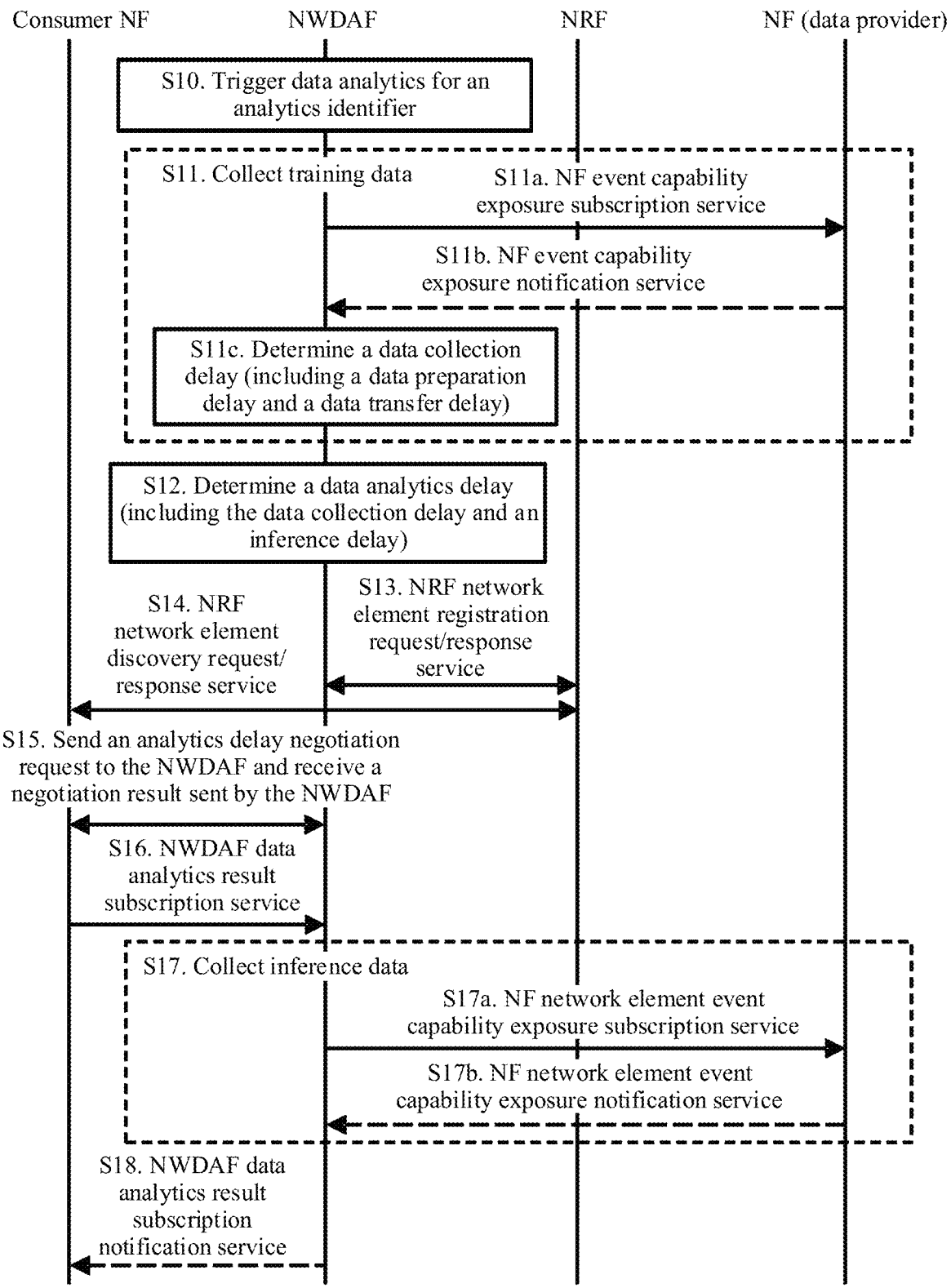
FIG. 13 is a schematic interaction diagram of a communication method in another application scenario according to an embodiment of this application.

As shown in FIG. 13, the following procedure is mainly included.

S10 to S12 are the same as S00 to S02 in Embodiment 1.

S13. The NWDAF triggers an NRF network element registration request/response service Nnrf_NFManagement_NFRegister_Request/Rsp to the NRF.

In comparison with Embodiment 1, in a process in which the NWDAF registers with the NRF, it is merely indicated to the NRF that the NWDAF supports analyzing data within a specified delay for an analytics ID, but the NRF is not notified of a specific supported analytics delay. The specified delay may be a delay threshold or a delay interval configured in the NWDAF. For example, the specified delay is greater than or equal to a data analytics delay X, and is less than or equal to a data analytics delay Y. The NWDAF sends indication information to the NRF only when the delay threshold or the delay interval is met.

S14. A consumer NF triggers an NRF network element discovery request/response service Nnrf_NFDiscovery_Request/Rsp to the NRF.

In comparison with Embodiment 1, in a process in which the consumer NF searches for the NWDAF by using the NRF, the NRF is indicated, by using the indication information (Support of real-time communication capability indicator), to return one or more NWDAFs that support real-time data analytics for the analytics ID.

S15. The consumer NF sends an analytics delay negotiation request Analytics delay negotiation Request to the NWDAF, and receives a negotiation result sent by the NWDAF.

The consumer NF negotiates with the one or more NWDAFs from the NRF one by one based on a data analytics delay requirement (expected analytics delay) to determine whether the data analytics delay requirement can be met. The NWDAF compares the supported analytics delay with the expected analytics delay to determine whether the NWDAF can meet the delay requirement of the consumer NF. If the supported analytics delay is less than or equal to the expected analytics delay, the NWDAF meets the delay requirement of the consumer NF. Otherwise, the NWDAF does not meet the delay requirement of the consumer NF, and notifies the consumer NF that the NWDAF does not meet the delay requirement of the consumer NF. The consumer NF selects an NWDAF from one or more NWDAFs that meet the delay requirement as a target NWDAF for requesting a data analytics result.

In another possible implementation, the consumer NF may request a supported analytics delay corresponding to the analytics ID in step S15, and then compare the supported analytics delay with the expected analytics delay to determine whether the NWDAF can meet the delay requirement. If the NWDAF meets the delay requirement, the NWDAF is used as the target NWDAF for subsequently requesting the data analytics result.

S16 to S18 are the same as S05 to S07 in Embodiment 1.

In this embodiment of this application, the consumer NF may continuously negotiate with the NWDAF to determine whether the analytics delay requirement is met, so that the consumer NF can determine the target NWDAF that meets the delay requirement.

Embodiment 3

In both Embodiment 1 and Embodiment 2, data management is integrated into an NWDAF. In Embodiment 3, when a plurality of NWDAFs are deployed, a DCCF is introduced to assist in efficient data collection.

Figure 14A:
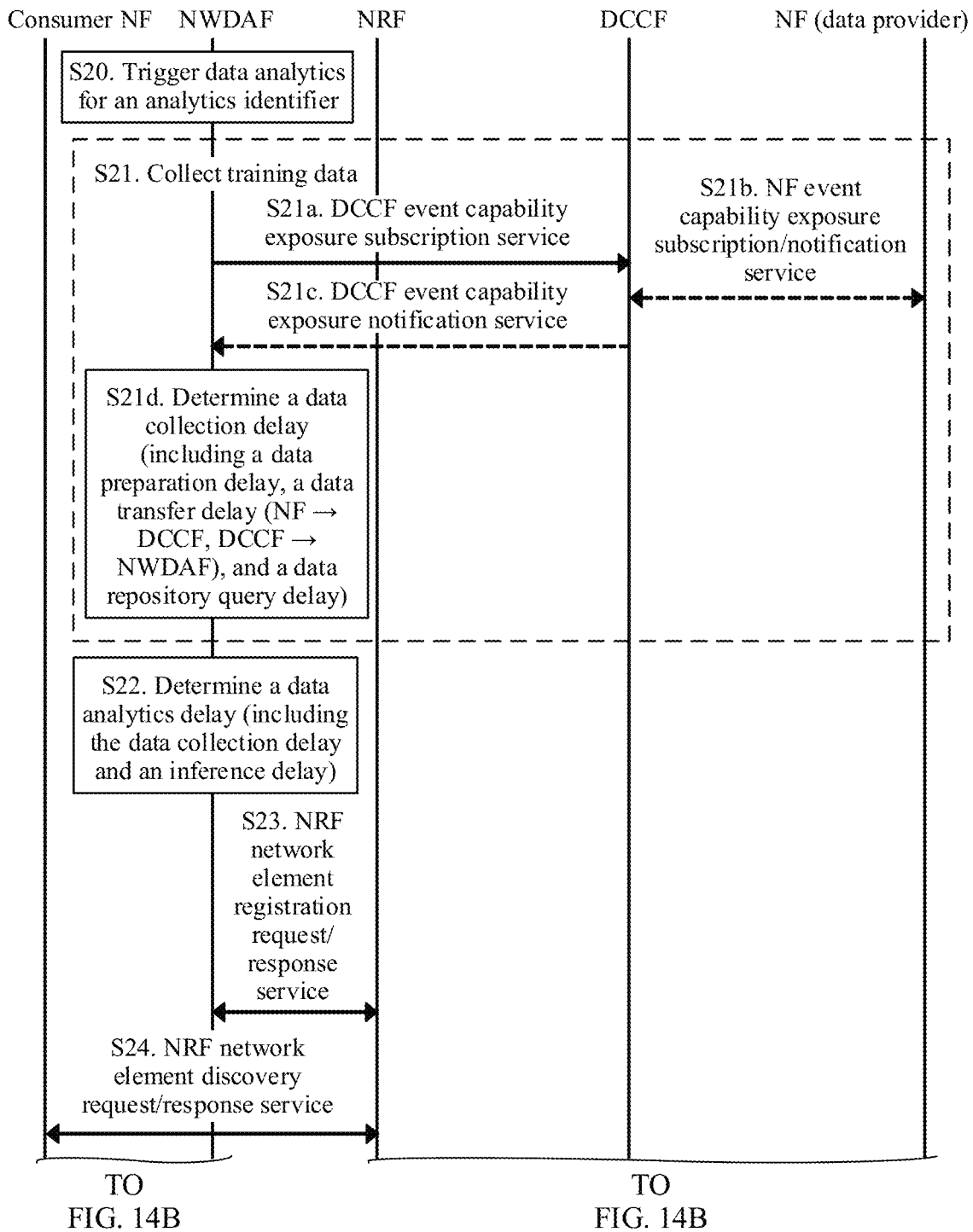
FIG. 14A and FIG. 14B are a schematic interaction diagram of a communication method in another application scenario according to an embodiment of this application.
Figure 14B:
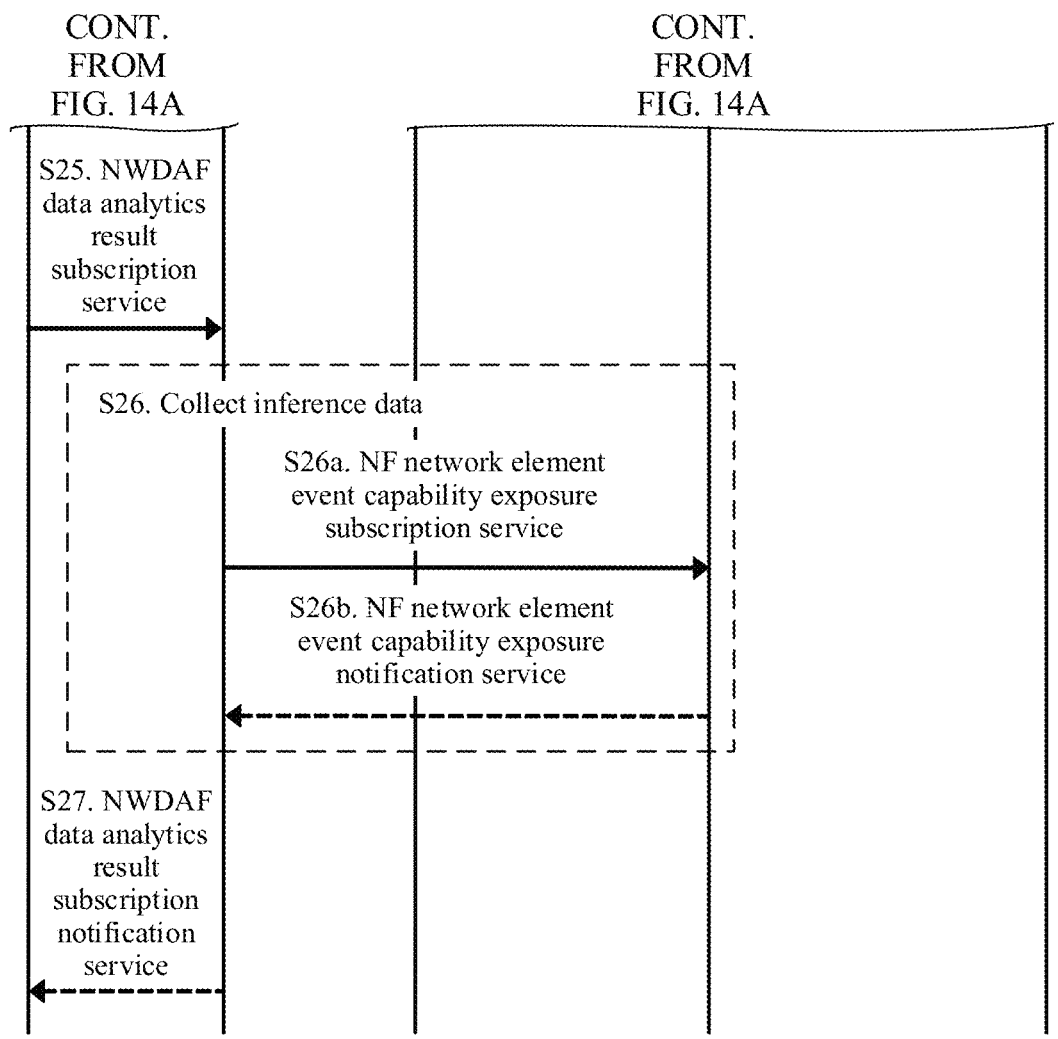

As shown in FIG. 14A and FIG. 14B, the following procedure is mainly included.

S20 is the same as S00 in Embodiment 1.

S21. The NWDAF collects training data, which mainly includes the following.

S21a. The NWDAF triggers a DCCF event capability exposure subscription service Ndccf_EventExposure_Subscribe to the DCCF to request data from the DCCF.

S21b. The DCCF triggers an NF event capability exposure subscription/notification service Nnf_EventExposure_Subscribe/Nnf_EventExposure_Notify to an NF to request the data from the NF. Then, the NF triggers an NF event capability exposure notification service Nnf_EventExposure_Notify to the DCCF to send the data to the DCCF. The service includes collected data, a data preparation delay on the NF, and start time for data transfer from the NF to the DCCF.

S21c. The DCCF triggers a DCCF event capability exposure notification service Ndccf_EventExposure_Notify to the NWDAF, and sends the collected data to the NWDAF. The service includes the collected data, a DCCF local data query delay, start time for data transfer from the DCCF to the NWDAF, the data preparation delay on the NF, and a data transfer delay between the NF and the DCCF.

S21d. The NWDAF determines a data collection delay. The data collection delay includes the data preparation delay, the data transfer delay (NF→DCCF, DCCF→NWDAF), and a data repository query delay. NF→DCCF represents a transfer delay from the NF to the DCCF, and DCCF→NWDAF represents a transfer delay from the DCCF to the NWDAF.

S22. The NWDAF determines a data analytics delay. The data analytics delay includes the data collection delay and an inference delay.

When the DCCF is used to store data, if a local data repository of the DCCF already stores the data to be requested by the NWDAF, the requested data may be directly returned through local data repository query. If the local data repository does not store the data to be requested by the NWDAF, the DCCF first triggers a data collection request to the NF (data provider), and sends the data to the NWDAF after obtaining the data. This mechanism prevents repeated data collection from the NF (data provider) when a plurality of NWDAFs request a same piece of data.

In comparison with Embodiment 1, in Embodiment 3, the DCCF and the data repository mechanism are mainly introduced between the NWDAF and the data provider NF. However, the data repository is not reflected in a network, and it may be considered that the data repository and the DCCF are co-deployed. Therefore, the data query delay is introduced if the NWDAF requests, from the DCCF, data corresponding to an event ID. If data already exists in the data repository at the DCCF side, the DCCF only needs to replicate the data and respond. Only the DCCF local data query delay and the transfer delay between the DCCF and the NWDAF are newly introduced. However, there is no data preparation delay. In this case, the data collection delay is {the data query delay+the data transfer delay between the DCCF and the NWDAF}. The data query delay is a delay caused by DCCF local data repository query.

If no data exists in the data repository at the DCCF side, the data preparation delay of the NF and the data transfer delay between the DCCF and the NF are introduced in addition to the query delay. In this case, the data collection delay is as follows: {the data query delay+the data preparation delay+the data transfer delay between the NF and the DCCF (that is, an NF→DCCF data transfer delay)+the data transfer delay between the DCCF and the NWDAF (that is, a DCCF→NWDAF data transfer delay)}.

Although there is no data in the data repository of the DCCF, the data query delay is also introduced. The data preparation delay is a delay of locally collecting data by the NF.

S23 to S27 are the same as S03 to S07 in Embodiment 1.

Determining of an inference delay of an analytics result and other steps are the same as those in Embodiment 1.

During NWDAF data collection, the DCCF (including the local data repository) is introduced. A process of the data collection changes. When the requested data does not exist in the data repository, the data collection delay increases. When the data repository includes the requested data, the data collection delay reduces. Therefore, the data analytics delay is affected.

In this embodiment of this application, in a training phase, a training platform releases a model on the NWDAF, and the NWDAF determines the analytics delay supported by the analytics ID. The analytics delay includes the data preparation delay, the data transfer delay, and the inference delay generated by the data analytics result. The NWDAF registers the analytics delay supported by the analytics ID with the NRF. The consumer NF queries the NRF for the NWDAF that meets the analytics delay requirement based on the analytics ID and the analytics delay requirement, and requests, from the NWDAF, the data analytics result corresponding to the analytics ID.

This embodiment of this application provides a network element that supports real-time data analytics. The NWDAF may evaluate an analytics delay that can be met for an analytics ID, and assist the consumer NF in searching for an appropriate NWDAF as required to obtain the data analytics result in real time or in semi-real time.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to embodiments, and the involved actions and modules are not necessarily required by this application.

To better implement the solutions of embodiments of this application, a related apparatus for implementing the solutions is further provided below.

Figure 15:
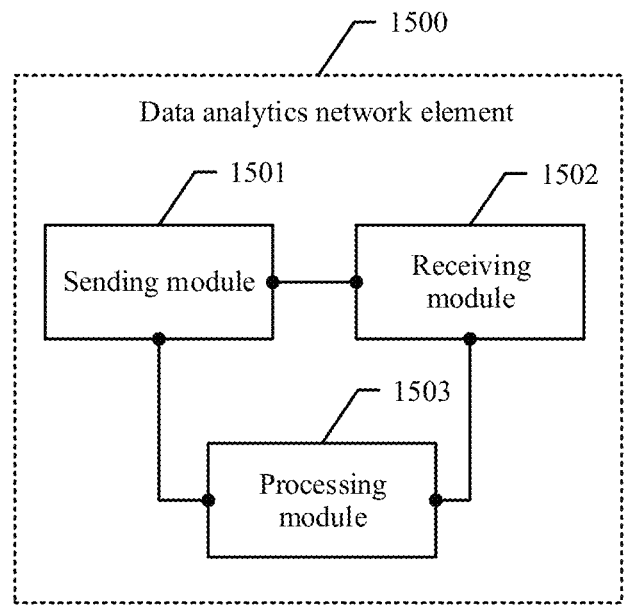
FIG. 15 is a schematic diagram of a structure of a data analytics network element according to an embodiment of this application.

FIG. 15 shows a data analytics network element 1500 according to an embodiment of this application. The data analytics network element 1500 may include a sending module 1501 and a receiving module 1502.

The sending module is configured to send a first request to a storage function network element. The first request includes delay information and/or indication information. The delay information includes one or more of the following information: a collection delay of first data, an inference delay of a data analytics result of the first data, and a transfer delay of the data analytics result. The indication information indicates that the data analytics network element supports analyzing data within a specified delay. The first request is used to store the delay information and/or the indication information into the storage function network element.

The receiving module is configured to receive a first response from the storage function network element. The first response indicates, to the data analytics network element, that the delay information and/or the indication information are/is successfully stored.

Further, the data analytics network element 1500 may further include a processing module 1503. The processing module 1503 may control the sending module 1501 to perform a sending action. The processing module 1503 may control the receiving module 1502 to perform a receiving action. The processing module 1503 is configured to perform a data processing operation of the data analytics network element in the foregoing method embodiments. The sending module 1501 is configured to perform a data sending operation of the data analytics network element in the foregoing method embodiments. The receiving module 1502 is configured to perform a data receiving operation of the data analytics network element in the foregoing method embodiments.

In the foregoing embodiment of this application, the data analytics network element sends the first request to the storage function network element. The first request includes the delay information and/or the indication information. The delay information includes one or more of the following information: the collection delay of the first data, the inference delay of the data analytics result of the first data, and the transfer delay of the data analytics result. The indication information indicates that the data analytics network element supports analyzing data within the specified delay. The first request is used to store the delay information and/or the indication information into the storage function network element. The data analytics network element receives the first response from the storage function network element. The first response indicates, to the data analytics network element, that the delay information and/or the indication information are/is successfully stored. The first request sent by the data analytics network element may include the delay information. The delay information may include one or more of the following information: the collection delay of the first data, the inference delay of the data analytics result of the first data, and the transfer delay of the data analytics result. Alternatively, the first request includes the indication information. The indication information indicates that the data analytics network element supports analyzing data within the specified delay. Therefore, the storage function network element may store the delay information and/or the indication information into the storage function network element based on the received first request, to enable the data analytics network element to determine a data analytics delay, and enable a network element that uses the data analytics result to predetermine, in advance, a delay requirement that can be met by the data analytics network element.

Figure 16:
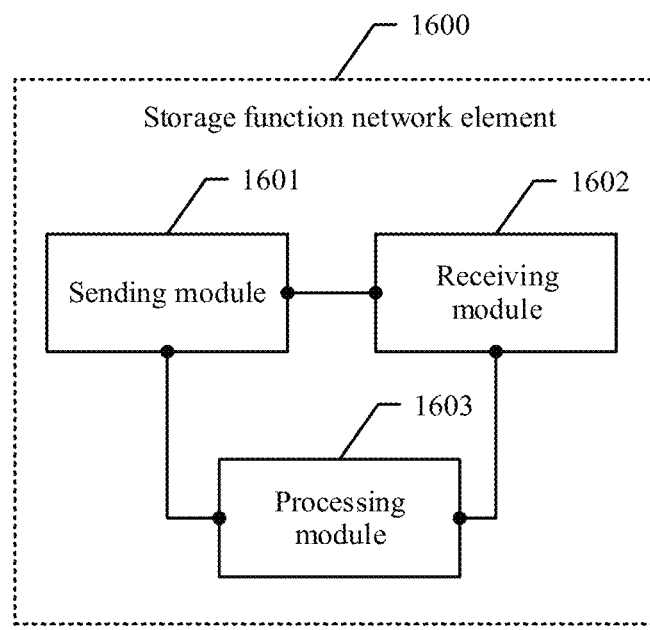
FIG. 16 is a schematic diagram of a structure of a storage function network element according to an embodiment of this application.

FIG. 16 shows a storage function network element 1600 according to an embodiment of this application. The storage function network element 1600 may include a sending module 1601 and a receiving module 1602.

The receiving module is configured to receive a first request from a data analytics network element. The first request includes delay information and/or indication information. The delay information includes one or more of the following information: a collection delay of first data, an inference delay of a data analytics result of the first data, and a transfer delay of the data analytics result. The indication information indicates that the data analytics network element supports analyzing the first data within a specified delay. The first request is used to store the delay information and/or the indication information into the storage function network element.

The sending module is configured to send a first response to the data analytics network element. The first response indicates, to the data analytics network element, that the delay information and/or the indication information are/is successfully stored.

Further, the storage function network element 1600 may further include a processing module 1603. The processing module 1603 may control the sending module 1601 to perform a sending action. The processing module 1603 may control the receiving module 1602 to perform a receiving action. The processing module 1603 is configured to perform a data processing operation of the storage function network element 1600 in the foregoing method embodiments. The sending module 1601 is configured to perform a data sending operation of the storage function network element 1600 in the foregoing method embodiments. The receiving module 1602 is configured to perform a data receiving operation of the storage function network element 1600 in the foregoing method embodiments.

In the foregoing embodiment of this application, the storage function network element receives the first request from the data analytics network element. The first request includes the delay information and/or the indication information. The delay information includes one or more of the following information: the collection delay of the first data, the inference delay of the data analytics result of the first data, and the transfer delay of the data analytics result. The indication information indicates that the data analytics network element supports analyzing the first data within the specified delay. The first request is used to store the delay information and/or the indication information into the storage function network element. The storage function network element sends the first response to the data analytics network element based on the first request. The first response indicates, to the data analytics network element, that the delay information and/or the indication information are/is successfully stored. Because the storage function network element may receive the first request from the data analytics network element, the storage function network element may obtain the delay information of the storage function network element, so that the storage function network element may determine one or more of the following information: the collection delay of the first data, the inference delay of the data analytics result of the first data, and the transfer delay of the data analytics result. Alternatively, the storage function network element may obtain the indication information of the storage function network element, so that the storage function network element may determine that the data analytics network element supports analyzing the first data within the specified delay. Therefore, the storage function network element may obtain a data analytics delay of the data analytics network element, to enable a network element that uses the data analytics result to predetermine, in advance, a delay requirement that can be met by the data analytics network element.

Figure 17:
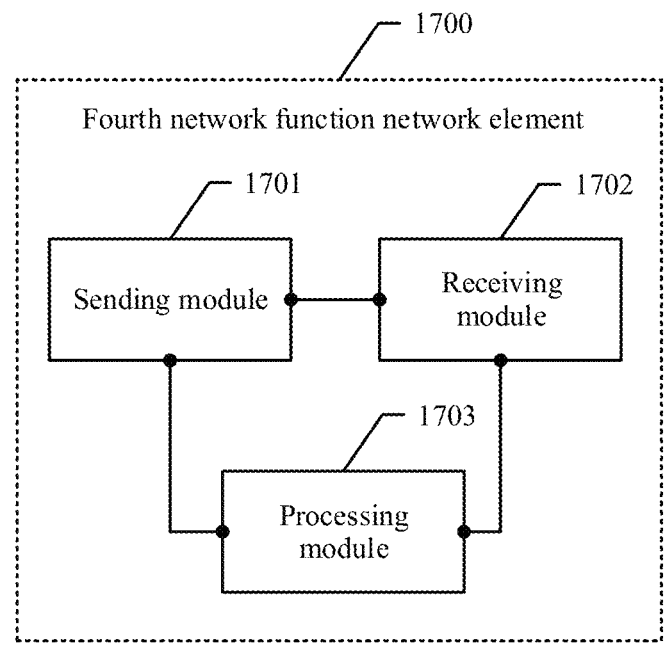
FIG. 17 is a schematic diagram of a structure of a fourth network function network element according to an embodiment of this application.

FIG. 17 shows a fourth network function network element 1700 according to an embodiment of this application. The fourth network function network element 1700 may include a sending module 1701, a receiving module 1702, and a processing module 1703.

The processing module is configured to send a seventh request to a storage function network element. The seventh request is used to request a data analytics network element.

The processing module is configured to receive a seventh response sent by the storage function network element. The seventh response includes one or more data analytics network elements. The one or more data analytics network elements respectively correspond to delay information.

The processing module is configured to determine, from the one or more data analytics network elements, a target data analytics network element that meets a data analytics delay requirement of the fourth network function network element.

The processing module 1703 may control the sending module 1701 to perform a sending action. The processing module 1703 may control the receiving module 1702 to perform a receiving action. The processing module 1703 is configured to perform a data processing operation of the fourth network function network element 1700 in the foregoing method embodiments. The sending module 1701 is configured to perform a data sending operation of the fourth network function network element 1700 in the foregoing method embodiment. The receiving module 1702 is configured to perform a data receiving operation of the fourth network function network element in the foregoing method embodiments.

In the foregoing embodiment of this application, the fourth network function network element sends the seventh request to the storage function network element. The seventh request is used to request the data analytics network element. The fourth network function network element receives the seventh response sent by the storage function network element. The seventh response includes the one or more data analytics network elements. The one or more data analytics network elements respectively correspond to the delay information. The fourth network function network element determines, from the one or more data analytics network elements, the target data analytics network element that meets the data analytics delay requirement of the fourth network function network element. Because the fourth network function network element may determine the delay information respectively corresponding to the one or more data analytics network elements, the fourth network function network element determines, from the one or more data analytics network elements, the target data analytics network element that meets the data analytics delay requirement of the fourth network function network element, so that the fourth network function network element can communicate with the target data analytics network element, to implement communication of the fourth network function network element when the data analytics delay requirement is met.

It should be noted that content such as information exchange between the modules/units of the apparatus and execution processes thereof is based on the same idea as the method embodiments of this application, and produces the same technical effects as the method embodiments of this application. For the specific content, refer to the foregoing descriptions in the method embodiments of this application, and details are not described herein again.

An embodiment of this application further provides a computer storage medium. The computer storage medium stores a program, and the program performs some or all of the steps described in the foregoing method embodiments.

Figure 18:
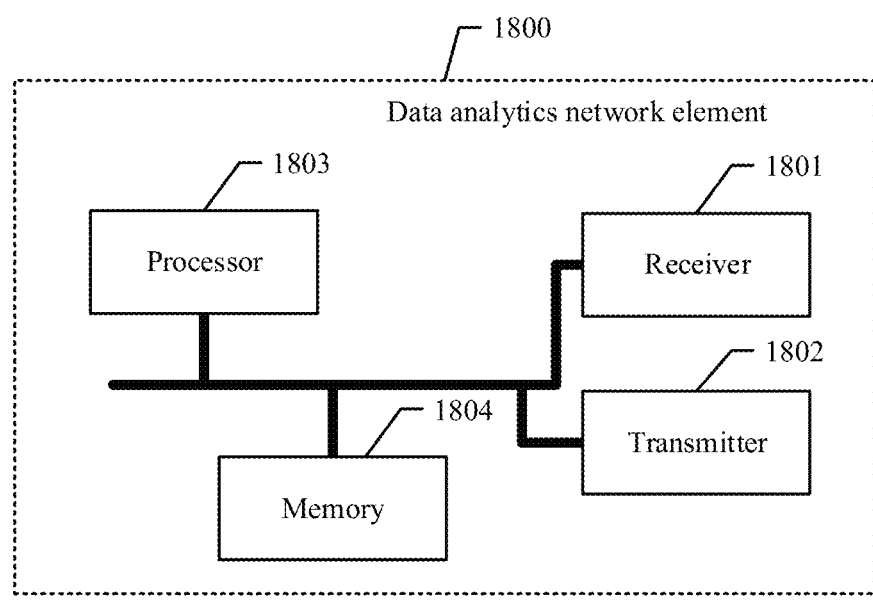
FIG. 18 is a schematic diagram of a structure of another data analytics network element according to an embodiment of this application.

The following describes another data analytics network element according to an embodiment of this application. Refer to FIG. 18. The data analytics network element 1800 includes: a receiver 1801, a transmitter 1802, a processor 1803, and a memory 1804 (a quantity of the processors 1803 in the data analytics network element 1800 may be one or more, and an example in which there is one processor is used in FIG. 18). In some embodiments of this application, the receiver 1801, the transmitter 1802, the processor 1803, and the memory 1804 may be connected through a bus or in another manner. An example in which the receiver 1801, the transmitter 1802, the processor 1803, and the memory 1804 are connected through a bus is used in FIG. 18. In a possible implementation, the receiver 1801 may be specifically a communication interface or an interface circuit sending module 1501, the transmitter 1802 may be specifically a communication interface or an interface circuit receiving module 1502, and the receiver 1801 and the transmitter 1802 are configured to exchange information between the data analytics network element and an external network element.

The memory 1804 may include a read-only memory and a random access memory, and provide instructions and data for the processor 1803. A part of the memory 1804 may further include a non-volatile random access memory (NVRAM). The memory 1804 stores an operating system and operation instructions, an executable module or a data structure, a subset thereof, or an extended set thereof. The operation instructions may include various operation instructions for performing various operations. The operating system may include various system programs, to implement various basic services and process a hardware-based task.

The processor 1803 controls an operation of the data analytics network element, and the processor 1803 may also be referred to as a central processing unit (CPU). In specific application, components of the data analytics network element are coupled together through a bus system. In addition to a data bus, the bus system may further include a power bus, a control bus, a state signal bus, or the like. However, for clear description, various types of buses in the figure are marked as the bus system.

The methods disclosed in the foregoing embodiments of this application may be applied to the processor 1803, or may be implemented by the processor 1803. The processor 1803 may be an integrated circuit chip and has a signal processing capability. In an implementation process, steps in the foregoing methods may be implemented by using a hardware integrated logic circuit in the processor 1803, or by using instructions in a form of software. The processor 1803 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1804, and the processor 1803 reads information in the memory 1804 and completes the steps in the foregoing methods in combination with hardware of the processor.

The receiver 1801 may be configured to: receive input digital or character information, and generate a signal input related to a related setting and function control of the data analytics network element. The transmitter 1802 may include a display device such as a display screen. The transmitter 1802 may be configured to output digital or character information through an external interface.

In this embodiment of this application, the processor 1803 is configured to perform a communication method performed by the data analytics network element.

The processor 1803 may be the foregoing processing module 1503.

The processor 1803 executes data in the memory 1804, so that the data analytics network element performs the foregoing communication method.

Figure 19:
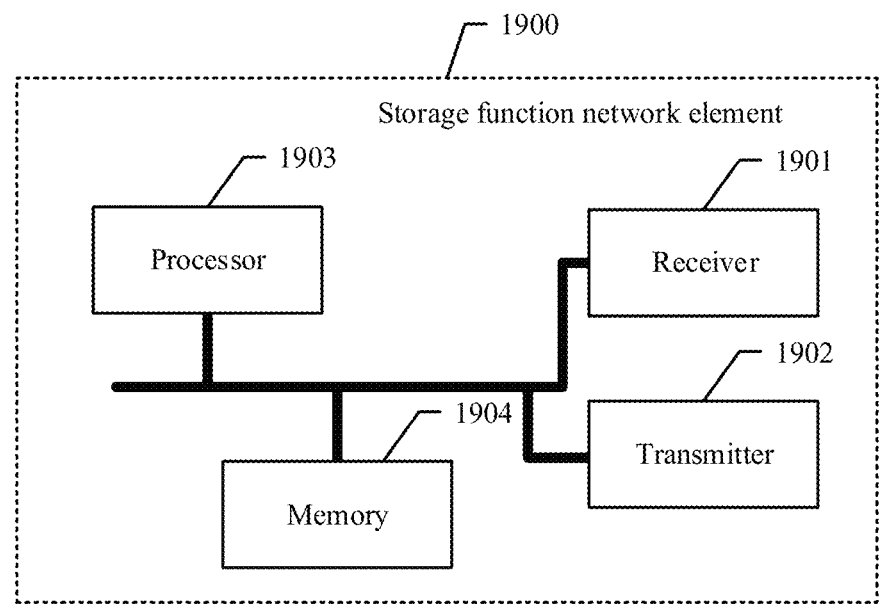
FIG. 19 is a schematic diagram of a structure of another storage function network element according to an embodiment of this application.

The following describes another storage function network element according to an embodiment of this application. Refer to FIG. 19. The storage function network element 1900 includes: a receiver 1901, a transmitter 1902, a processor 1903, and a memory 1904 (a quantity of the processors 1903 in the storage function network element 1900 may be one or more, and an example in which there is one processor is used in FIG. 19). In some embodiments of this application, the receiver 1901, the transmitter 1902, the processor 1903, and the memory 1904 may be connected through a bus or in another manner. An example in which the receiver 1901, the transmitter 1902, the processor 1903, and the memory 1904 are connected through a bus is used in FIG. 19. In a possible implementation, the receiver 1901 may be specifically a communication interface or an interface circuit sending module 1601, the transmitter 1902 may be specifically a communication interface or an interface circuit receiving module 1602, and the receiver 1901 and the transmitter 1902 are configured to exchange information between the storage function network element and an external network element.

The memory 1904 may include a read-only memory and a random access memory, and provide instructions and data for the processor 1903. A part of the memory 1904 may further include an NVRAM. The memory 1904 stores an operating system and operation instructions, an executable module or a data structure, a subset thereof, or an extended set thereof. The operation instructions may include various operation instructions for performing various operations. The operating system may include various system programs, to implement various basic services and process a hardware-based task.

The processor 1903 controls an operation of the storage function network element, and the processor 1903 may also be referred to as a CPU. In specific application, components of the storage function network element are coupled together through a bus system. In addition to a data bus, the bus system may further include a power bus, a control bus, a state signal bus, or the like. However, for clear description, various types of buses in the figure are marked as the bus system.

The methods disclosed in the foregoing embodiments of this application may be applied to the processor 1903, or may be implemented by the processor 1903. The processor 1903 may be an integrated circuit chip and has a signal processing capability. In an implementation process, steps in the foregoing methods may be implemented by using a hardware integrated logic circuit in the processor 1903, or by using instructions in a form of software. The processor 1903 may be a general-purpose processor, a DSP, an ASIC, an FPGA or another programmable logic device, a discrete gate or transistor logic device, or a discrete hardware component. The processor may implement or perform the methods, the steps, and logical block diagrams that are disclosed in embodiments of this application. The general purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1904, and the processor 1903 reads information in the memory 1904 and completes the steps in the foregoing methods in combination with hardware of the processor.

In this embodiment of this application, the processor 1903 is configured to perform a communication method performed by the storage function network element.

The processor 1903 may be the foregoing processing module 1603.

The processor 1903 executes data in the memory 1904, so that the storage function network element performs the foregoing communication method.

Figure 20:
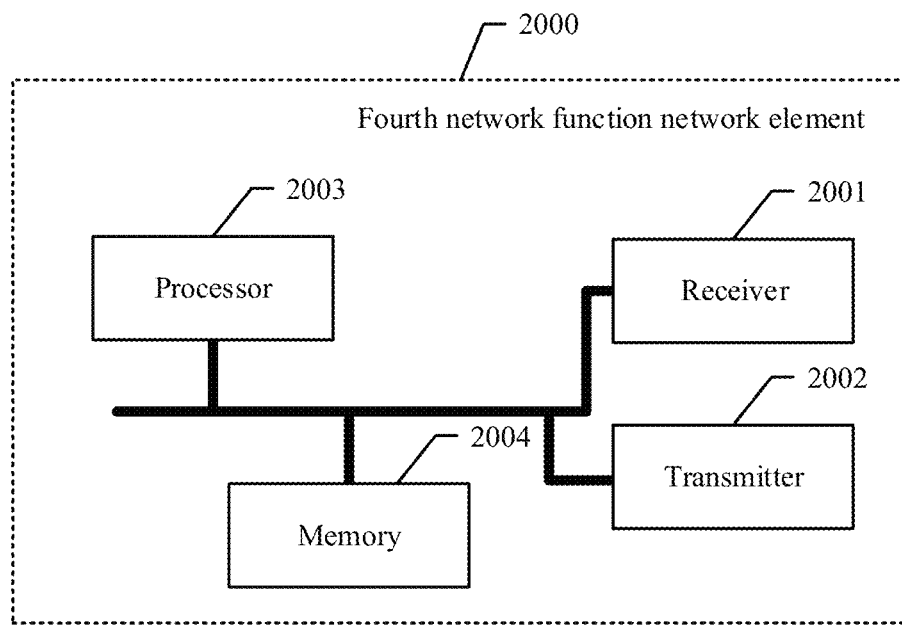
FIG. 20 is a schematic diagram of a structure of another fourth network function network element according to an embodiment of this application.

The following describes another fourth network function network element according to an embodiment of this application. Refer to FIG. 20. The fourth network function network element 2000 includes: a receiver 2001, a transmitter 2002, a processor 2003, and a memory 2004 (a quantity of the processors 2003 in the fourth network function network element 2000 may be one or more, and an example in which there is one processor is used in FIG. 20). In some embodiments of this application, the receiver 2001, the transmitter 2002, the processor 2003, and the memory 2004 may be connected through a bus or in another manner. An example in which the receiver 2001, the transmitter 2002, the processor 2003, and the memory 2004 are connected through a bus is used in FIG. 20. In a possible implementation, the receiver 2001 may be specifically a communication interface or an interface circuit sending module 1701, the transmitter 2002 may be specifically a communication interface or an interface circuit receiving module 1702, and the receiver 2001 and the transmitter 2002 are configured to exchange information between the fourth network function network element and an external network element.

The memory 2004 may include a read-only memory and a random access memory, and provide instructions and data for the processor 2003. A part of the memory 2004 may further include an NVRAM. The memory 2004 stores an operating system and operation instructions, an executable module or a data structure, a subset thereof, or an extended set thereof. The operation instructions may include various operation instructions for performing various operations. The operating system may include various system programs, to implement various basic services and process a hardware-based task.

The processor 2003 controls an operation of the fourth network function network element, and the processor 2003 may also be referred to as a CPU. In specific application, components of the fourth network function network element are coupled together through a bus system. In addition to a data bus, the bus system may further include a power bus, a control bus, a state signal bus, or the like. However, for clear description, various types of buses in the figure are marked as the bus system.

The methods disclosed in the foregoing embodiments of this application may be applied to the processor 2003, or may be implemented by the processor 2003. The processor 2003 may be an integrated circuit chip and has a signal processing capability. In an implementation process, steps in the foregoing methods may be implemented by using a hardware integrated logical circuit in the processor 2003, or by using instructions in a form of software. The processor 2003 may be a general-purpose processor, a DSP, an ASIC, an FPGA or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2004, and the processor 2003 reads information in the memory 2004 and completes the steps in the foregoing methods in combination with hardware of the processor.

In this embodiment of this application, the processor 2003 is configured to perform a communication method performed by the fourth network function network element.

The processor 2003 may be the foregoing processing module 1703.

The processor 2003 executes data in the memory 2004, so that the fourth network function network element performs the foregoing communication method.

In another possible design, when the data analytics network element, the storage function network element, or the fourth network function network element is a chip, the chip includes a processing unit and a communication unit. The processing unit may be, for example, a processor. The communication unit may be, for example, an input/output interface, a pin, or a circuit. The processing unit may execute computer-executable instructions stored in a storage unit, so that a chip in the data analytics network element performs the communication method according to any one of the first aspect, a chip in the storage function network element performs the communication method according to any one of the second aspect, and a chip in the fourth network function network element performs the communication method according to any one of the third aspect. Optionally, the storage unit is a storage unit in the chip, for example, a register or a cache. Alternatively, the storage unit may be a storage unit that is in a terminal and that is located outside the chip, for example, a read-only memory (ROM) or another type of static storage device that can store static information and instructions, or a random access memory (RAM).

The processor mentioned anywhere above may be a general-purpose central processing unit, a microprocessor, an ASIC, or one or more integrated circuits configured to control program execution of the methods.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or some of the foregoing embodiments may be implemented by software, hardware, firmware, or any combination thereof. When software is used to implement embodiments, all or some of embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, and or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, comprising:

receiving, by a storage function network element, a first request from a data analytics network element, wherein the first request comprises at least one of delay information or indication information, wherein the delay information comprises one or more of the following information: a collection delay of first data, an inference delay of a data analytics result of the first data, or a transfer delay of the data analytics result, wherein the indication information indicates that the data analytics network element supports analyzing the first data within a specified delay, and wherein the at least one of the delay information or the indication information is stored into the storage function network element based on the first request; and sending, by the storage function network element, a first response to the data analytics network element, wherein the first response indicates that the at least one of the delay information or the indication information is successfully stored.

2. The method according to claim 1, further comprising:

receiving, by the storage function network element, a seventh request from a fourth network function network element, wherein the seventh request requests information of the data analytics network element; and sending, by the storage function network element, a seventh response to the fourth network function network element, wherein the seventh response comprises information of one or more data analytics network elements.

3. The method according to claim 2, wherein the seventh request further comprises a data analytics delay requirement of the fourth network function network element, and the method further comprises:
    determining, by the storage function network element based on at least one piece of delay information corresponding to at least one data analytics network element, the one or more data analytics network elements that meet the data analytics delay requirement; and
    wherein sending, by the storage function network element, the seventh response to the fourth network function network element comprises:
        sending, by the storage function network element, the seventh response to the fourth network function network element, wherein the seventh response comprises the information of the one or more data analytics network elements that meet the data analytics delay requirement.

4. The method according to claim 2, wherein sending, by the storage function network element, the seventh response to the fourth network function network element comprises:
    determining, by the storage function network element, the one or more data analytics network elements that support analyzing data within the specified delay; and
    sending, by the storage function network element, the seventh response to the fourth network function network element, wherein the seventh response comprises the information of the one or more data analytics network elements that support analyzing data within the specified delay.

5. A communication method, comprising:
    sending, by a fourth network function network element, a seventh request to a storage function network element, wherein the seventh request requests information of a data analytics network element;
    receiving, by the fourth network function network element, a seventh response sent by the storage function network element, wherein the seventh response comprises information of one or more data analytics network elements, and the one or more data analytics network elements respectively correspond to delay information; and
    determining, by the fourth network function network element from the one or more data analytics network elements, a target data analytics network element that meets a data analytics delay requirement of the fourth network function network element.

6. The method according to claim 5, wherein determining, by the fourth network function network element from the one or more data analytics network elements, the target data analytics network element that meets the data analytics delay requirement of the fourth network function network element comprises:
    determining, by the fourth network function network element from the seventh response, the delay information respectively corresponding to the one or more data analytics network elements; and
    determining, by the fourth network function network element, the target data analytics network element based on the delay information respectively corresponding to the one or more data analytics network elements and the data analytics delay requirement.

7. The method according to claim 5, wherein determining, by the fourth network function network element, the target data analytics network element based on the seventh response comprises:
    sending, by the fourth network function network element, the data analytics delay requirement to the one or more data analytics network elements separately;
    receiving, by the fourth network function network element, a delay matching result sent by at least one data analytics network element that meets the data analytics delay requirement; and
    determining, by the fourth network function network element, the target data analytics network element from the at least one data analytics network element that sends the delay matching result.

8. A communication apparatus, comprising:
    at least one processor; and
    a non-transitory computer-readable storage medium storing a program to be executed by the at least one processor, the program including instructions to:
        receive a first request from a data analytics network element, wherein the first request comprises at least one of delay information or indication information, wherein the delay information comprises one or more of a collection delay of first data, an inference delay of a data analytics result of the first data, or a transfer delay of the data analytics result, wherein the indication information indicates that the communication apparatus supports analyzing data within a specified delay, and wherein the at least one of the delay information or the indication information is stored into a storage function network element based on the first request; and
        send a first response to the data analytics network element, wherein the first response indicates, to the communication apparatus, that the at least one of the delay information or the indication information is successfully stored.

9. The apparatus according to claim 8, wherein the instructions further include instructions to:
    send a second request to a first network function network element, wherein the second request requests the first data;
    receive a seventh request from a fourth network function network element, wherein the seventh request requests information of the data analytics network element; and
    send a seventh response to the fourth network function network element, wherein the seventh response comprises information of one or more data analytics network elements.

10. The apparatus according to claim 9, wherein the seventh request further comprises a data analytics delay requirement of the fourth network function network element, and the instructions further include instructions to:
    determine, based on at least one piece of delay information corresponding to at least one data analytics network element, the one or more data analytics network elements that meet the data analytics delay requirement; and
    wherein sending the seventh response to the fourth network function network element comprises:
        sending the seventh response to the fourth network function network element, wherein the seventh response comprises information of the one or more data analytics network elements that meet the data analytics delay requirement.

11. The apparatus according to claim 9, wherein sending the seventh response to the fourth network function network element comprises:

determining the one or more data analytics network elements that support analyzing data within the specified delay; and sending the seventh response to the fourth network function network element, wherein the seventh response comprises the information of the one or more data analytics network elements that support analyzing data within the specified delay.

12. A communication apparatus, comprising:

at least one processor; and a non-transitory computer-readable storage medium storing a program to be executed by the at least one processor, the program including instructions to:

send a seventh request to a storage function network element, wherein the seventh request requests information of a data analytics network element;

receive a seventh response sent by the storage function network element, wherein the seventh response comprises one or more data analytics network elements, and the one or more data analytics network elements respectively correspond to delay information; and determine from the one or more data analytics network elements, a target data analytics network element that meets a data analytics delay requirement of a fourth network function network element.

13. The apparatus according to claim 12, wherein determining, from the one or more data analytics network elements, the target data analytics network element that meets the data analytics delay requirement of the fourth network function network element comprises:

determining, from the seventh response, the delay information respectively corresponding to the one or more data analytics network elements; and determining the target data analytics network element based on the delay information respectively corresponding to the one or more data analytics network elements and the data analytics delay requirement.

14. The apparatus according to claim 12, wherein determining the target data analytics network element based on the seventh response comprises:

sending the data analytics delay requirement to the one or more data analytics network elements separately;

receiving a delay matching result sent by at least one data analytics network element that meets the data analytics delay requirement; and determining the target data analytics network element from the at least one data analytics network element that sends the delay matching result.

15. The method according to claim 1, wherein the method further comprises:

sending, by the data analytics network element, the first request; and receiving, by the data analytics network element, the first response.

* * * * *